(12) United States Patent
Ito et al.

(10) Patent No.: US 7,843,101 B2
(45) Date of Patent: Nov. 30, 2010

(54) INTERIOR PERMANENT MAGNET ELECTRIC MOTOR INCLUDING A ROTOR HAVING CIRCUMFERENTIAL SURFACE PORTIONS WITH DEFINED CURVE PROFILES

(75) Inventors: Isao Ito, Aichi (JP); Masashi Kuroko, Aichi (JP); Mitsuhiro Suzuki, Aichi (JP); Shoji Mano, Aichi (JP)

(73) Assignee: Aichi Elec Co., Kasugai-shi, Aichi (JP)

( * ) Notice: Subject to any disclaimer, the term of this patent is extended or adjusted under 35 U.S.C. 154(b) by 446 days.

(21) Appl. No.: 11/563,305

(22) Filed: Nov. 27, 2006

(65) Prior Publication Data

US 2007/0126304 A1    Jun. 7, 2007

(30) Foreign Application Priority Data

Dec. 1, 2005    (JP)    ............................. 2005-347734

(51) Int. Cl.
    H02K 21/12    (2006.01)
    H02K 1/22     (2006.01)
    H02K 1/27     (2006.01)

(52) U.S. Cl. .......................... 310/156.56; 310/156.46; 310/156.53; 310/156.57; 310/156.58; 417/410.1; 417/423.1

(58) Field of Classification Search ............ 310/156.56, 310/156.55, 156.48, 156.01, 156.33, 156.46, 310/156.53, 156.57, 156.58; 324/147, 146; 417/410.1, 423.1; H02K 21/12, 1/27, 1/22
See application file for complete search history.

(56) References Cited

U.S. PATENT DOCUMENTS

| 5,369,325 | A | * | 11/1994 | Nagate et al. | .......... 310/156.54 |
| 5,666,015 | A | * | 9/1997 | Uchibori et al. | ............. 310/261 |
| 5,672,926 | A | * | 9/1997 | Brandes et al. | ........ 310/156.53 |
| 6,047,460 | A | * | 4/2000 | Nagate et al. | ................. 29/598 |
| 6,049,153 | A |   | 4/2000 | Nishiyama et al. | |
| 6,087,752 | A | * | 7/2000 | Kim et al. | .................... 310/261 |
| 6,147,428 | A |   | 11/2000 | Takezawa et al. | |
| 6,300,700 | B1 |  | 10/2001 | Nishiyama et al. | |

(Continued)

FOREIGN PATENT DOCUMENTS

JP    56171575    12/1981

(Continued)

*Primary Examiner*—Quyen Leung
*Assistant Examiner*—Michael Andrews
(74) *Attorney, Agent, or Firm*—Dennison, Schultz & Macdonald

(57) ABSTRACT

A rotary shaft 60 having an outside diameter larger than the bore diameter of a rotary shaft insert hole 59 of a rotor 50 is inserted into the rotary shaft insert hole 59. A magnet insert hole 51a1 is provided in a main magnetic pole [a] of the rotor 50. Permanent magnets 52a1 to 52a3 are inserted into the magnet insert hole 51a1 such that a gap is formed between the permanent magnets 52a1 to 52a3 and the magnet insert hole 51a1. A semi-tubular rivet insert hole 55a and interlocks 57a1, 57a2 elongated in the radial direction of the rotor are disposed radially outward of the magnet insert hole 51a in the rotor. A semi-tubular rivet 56a is inserted into the semi-tubular rivet insert hole 55a such that a gap is formed between the semi-tubular rivet 56a and the semi-tubular rivet insert hole 55a. Passage holes 58ab, 58da are provided in the auxiliary magnetic poles [ab], [da].

18 Claims, 11 Drawing Sheets

U.S. PATENT DOCUMENTS

| | | | |
|---|---|---|---|
| 6,356,001 | B1 | 3/2002 | Nishiyama et al. |
| 6,369,480 | B1 | 4/2002 | Nishiyama et al. |
| 6,759,778 | B2 * | 7/2004 | Nishiyama et al. ..... 310/156.53 |
| 6,849,981 | B2 | 2/2005 | Kojima |
| 6,917,133 | B2 * | 7/2005 | Koharagi et al. ....... 310/156.57 |
| 6,919,663 | B2 * | 7/2005 | Iles-Klumpner ....... 310/156.53 |
| 6,943,474 | B2 * | 9/2005 | Inayama et al. ........ 310/156.41 |
| 6,979,924 | B2 | 12/2005 | Nishiyama et al. |
| 7,605,510 | B2 * | 10/2009 | Okuma et al. .......... 310/156.53 |

FOREIGN PATENT DOCUMENTS

| | | |
|---|---|---|
| JP | 58105779 | 7/1993 |
| JP | 05236684 | 9/1993 |
| JP | 05236686 | 9/1993 |
| JP | 58816 | 11/1993 |
| JP | 588165 | 11/1993 |
| JP | 06245451 | 9/1994 |
| JP | 711859 | 2/1995 |
| JP | 07222384 | 8/1995 |
| JP | 07236239 | 9/1995 |
| JP | 07236240 | 9/1995 |
| JP | 09009537 | 1/1997 |
| JP | 10201151 | 7/1998 |
| JP | 11146582 | 5/1999 |
| JP | 2000197292 | 7/2000 |
| JP | 2000350393 | 12/2000 |
| JP | 2001086672 | 3/2001 |
| JP | 2001161040 | 6/2001 |
| JP | 2001161041 | 6/2001 |
| JP | 2001161042 | 6/2001 |
| JP | 2001169484 | 6/2001 |
| JP | 2001178045 | 6/2001 |
| JP | 2001178046 | 6/2001 |
| JP | 2002010541 | 1/2002 |
| JP | 2002027690 | 1/2002 |
| JP | 2002078255 | 3/2002 |
| JP | 2002084691 | 3/2002 |
| JP | 2002084694 | 3/2002 |
| JP | 2002101629 | 4/2002 |
| JP | 2002136011 | 5/2002 |
| JP | 2002238193 | 8/2002 |
| JP | 2002315243 | 10/2002 |
| JP | 2003284275 | 10/2003 |
| JP | 2004260972 | 9/2004 |
| JP | 2005168183 | 6/2005 |
| JP | 2005086955 | 9/2005 |

* cited by examiner between magnetic poles center of the magnetic pole

INTERIOR PERMANENT MAGNET ELECTRIC MOTOR INCLUDING A ROTOR HAVING CIRCUMFERENTIAL SURFACE PORTIONS WITH DEFINED CURVE PROFILES

BACKGROUND OF THE INVENTION

1. Field of the Invention

The present invention relates to a permanent magnet rotating machine including a rotor having magnet insert holes for receiving permanent magnets, and more particularly, to a technique for reducing influence caused when a rotary shaft is inserted into a rotary shaft insert hole of the rotor.

2. Description of the Related Art

Generally, a permanent magnet motor having a rotor in which permanent magnets are inserted into magnet insert holes is used as a motor for driving a compressor which is installed, for example, in an air conditioner or a refrigerator. Such a permanent magnet motor is typically referred to as an "interior permanent magnet motor (IPM motor)".

FIG. 11 shows a rotor 850 of a permanent magnet motor disclosed in Japanese laid-open patent publication No. 7-236239, which is shown in cross section (taken in a direction perpendicular to the axial direction).

The rotor 850 is formed of a plurality of laminated electrical steel. The periphery surface of the rotor 850 is formed of salient-pole portions 850A1 to 850A4 forming magnetic poles and recesses 850B1 to 850B4. A rotary shaft insert hole 859, magnet insert holes 851a to 851d, semi-tubular rivet insert holes 855a to 855d, interlocks 857ab to 857da and passage holes 858ab to 858da are arranged in the rotor 850.

A rotary shaft 860 having an outside diameter larger than the bore diameter of the rotary shaft insert hole 859 is shrink fitted or press fitted into the rotary shaft insert hole 859. The shrink fitting is effected by enlarging the bore diameter of the rotary shaft insert hole 859 by heating the rotor 850 and then inserting the rotary shaft 860 into the rotary shaft insert hole 859. The press fitting is effected by inserting the rotary shaft 860 into the rotary shaft insert hole 859 by pushing in the rotary shaft 860 with a strong force.

Permanent magnets 852a to 852d are press fitted into the magnet insert holes 851a to 851d. Semi-tubular rivets 856a to 856d for integrating the laminated electrical steel sheets are inserted into the semi-tubular rivet insert holes 855a to 855d. The interlocks 857ab to 857da elongated in the circumferential direction of the rotor serve to lock the electrical steel sheets when laminated. The passage holes 858ab to 858da are used as oil passages.

In the rotor 850 shown in FIG. 11, the rotary shaft 860 is inserted into the rotary shaft insert hole 859 by shrink fitting or press fitting. Therefore, when the rotary shaft 860 is inserted into the rotary shaft insert hole 859, the inner wall surface of the rotary shaft insert hole 859 is pressed by the outer surface of the rotary shaft 860, so that the outside diameter of the rotor 850 expands as shown in FIG. 11 by a broken line.

When the outside diameter of the rotor 850 expands, harmonic components of the induced electromotive force of a stator winding increase. As a result, iron loss caused by the harmonic components increases and the motor performance is deteriorated. Further, if the gap between the outer circumferential surface of the rotor 850 and the inner circumferential surface of the stator is unevenly narrowed, noise and vibration may increase.

Further, in the rotor 850 shown in FIG. 11, the permanent magnets 852a to 852d are press fitted into the magnet insert holes 851a to 851d. Therefore, when the rotary shaft 860 is inserted into the rotary shaft insert hole 859, stress acts upon the rotor in such a manner as to expand its outside diameter and is applied to the permanent magnets 852a to 852d via the magnet insert holes 851a to 851d. As a result, the permanent magnets 852a to 852d may be cracked or chipped. Particularly, when the rotary shaft 860 is shrink fitted into the rotary shaft insert hole 859, stress is produced by the difference between the thermal expansion coefficients of the rotor 850 and the permanent magnets 852a to 852d and also applied to the permanent magnets 852a to 852d. Therefore, there is an increased possibility that the permanent magnets 852a to 852d may be cracked or chipped.

SUMMARY OF THE INVENTION

Accordingly, it is an object of the present invention to provide a technique for reducing influence caused when a rotary shaft having a diameter larger than the bore diameter of the rotary shaft insert hole is inserted into the rotary shaft insert hole.

In one aspect of the present invention, a rotor has a rotary shaft insert hole for receiving a rotary shaft, magnet insert holes for receiving permanent magnets and semi-tubular rivet insert holes for receiving semi-tubular rivets. The rotor has main magnetic poles and auxiliary magnetic poles which alternate in the circumferential direction. The magnet insert holes are disposed in the main magnetic poles, and the semi-tubular rivet insert holes are disposed in the auxiliary magnetic poles.

The rotary shaft has an outside diameter larger than a bore diameter of the rotary shaft insert hole and is inserted into the rotary shaft insert hole. The permanent magnets are inserted into the magnet insert holes such that a gap is formed between each of the magnet insert holes and the assigned permanent magnet. The semi-tubular rivets are inserted into the semi-tubular rivet insert holes such that a gap is formed between each of the semi-tubular rivet insert hole and the assigned semi-tubular rivet.

When the rotary shaft having an outside diameter larger than the bore diameter of the rotary shaft insert hole is inserted into the rotary shaft insert hole, stress that acts to expand the outside diameter of the rotor is produced. Stress that acts to expand the outside diameter of each of the main magnetic poles of the rotor is absorbed by the gap between the magnet insert hole and the permanent magnet. Further, stress that acts to expand the outside diameter of each of the auxiliary magnetic poles of the rotor is absorbed by the gap between the semi-tubular rivet insert hole and the semi-tubular rivet. Further, in the auxiliary magnetic poles in which the inside surface and the outside surface of the rotor are directly connected to each other without a magnet insert hole therebetween, the rotor is integrated by the semi-tubular rivets, so that the strength of the rotor can be increased.

A passage hole may be formed in each of the auxiliary magnetic poles. Typically, a passage extends through the rotor in the axial direction. The stress that acts to expand the outside diameter of the auxiliary magnetic pole of the rotor is also absorbed by the passage hole.

Preferably, the passage hole may be disposed radially inward of the semi-tubular rivet insert hole in the rotor, and particularly preferably, in a radially inward region of the rotor. By providing the passage hole in a radially inward region of the rotor, centrifugal force (fluid resistance) that acts upon a medium flowing through the passage hole can be reduced.

An interlock may be provided in the main magnetic pole or the auxiliary magnetic pole and elongated in the radial direction of the rotor. The interlock is formed by processing an electrical steel sheet. The interlock elongated in the radial direction of the rotor comprises a wedge-like projection which is inclined radially outward and inward in the axial direction. The stress that acts to expand the outside diameter of the main magnetic pole or the auxiliary magnetic pole of the rotor is also absorbed by the interlock.

In the construction in which both the semi-tubular rivet insert hole and the interlock are formed in the same main magnetic pole or the same auxiliary magnetic pole, preferably, the interlock is disposed radially outward of the semi-tubular rivet insert hole in the rotor, and particularly preferably, in a radially outward region of the rotor. With this arrangement, the amount of magnetic flux flowing through the radially outward region of the rotor, which may cause noise and vibration, can be reduced.

An outer circumferential surface of the rotor may comprise first outer circumferential surface portions each having a first curve profile which intersects with a line (d-axis) connecting the center of the rotor and the center of the assigned main magnetic pole in the circumferential direction, and second outer circumferential surface portions each having a second curve profile which intersects with a line (q-axis) connecting the center of the rotor and the center of the assigned auxiliary magnetic pole in the circumferential direction.

The first and second curve profiles are formed such that the maximum width of a gap between the second outer circumferential surface portion and the inside surface of the stator is larger than the maximum width of a gap between the first outer circumferential surface portion and the inside surface of the stator. Typically, the first curve profile has a circular arc shape having its center of curvature on the d-axis, and the second curve profile has a circular arc shape having its center of curvature on the q-axis. The centers of curvature of the circular arc shapes of the first and second curve profiles may be on the same point or on different points. In the construction in which the circular arc shapes have the centers of curvature on different points, the radius of curvature of the second curve profile is larger than that of the first curve profile.

Further, a recess may be formed in the outer circumferential surface of the rotor and in a position to face an end wall of the magnet insert hole which is adjacent to the outer circumferential surface of the rotor. In the construction in which the outer circumferential surface of the rotor comprises first and second outer circumferential surface portions, the recess is formed in each of the second outer circumferential surface portions.

In another aspect of the present invention, a rotor has a rotary shaft insert hole for receiving a rotary shaft, magnet insert holes for receiving permanent magnets, semi-tubular rivet insert holes for receiving semi-tubular rivets, and passage holes. The rotor has main magnetic poles and auxiliary magnetic poles which alternate in the circumferential direction. The magnet insert holes and the semi-tubular rivet insert holes are disposed in the main magnetic poles, and the passage holes are disposed in the auxiliary magnetic poles. The semi-tubular rivet insert holes are located radially outward of the magnet insert holes.

The rotary shaft has an outside diameter larger than a bore diameter of the rotary shaft insert hole and is inserted into the rotary shaft insert hole. The permanent magnets are inserted into the magnet insert holes such that a gap is formed between each of the magnet insert holes and the assigned permanent magnet. The semi-tubular rivets are inserted into the semi-tubular rivet insert holes such that a gap is formed between each of the semi-tubular rivet insert holes and the assigned semi-tubular rivet.

When the rotary shaft having an outside diameter larger than the bore diameter of the rotary shaft insert hole is inserted into the rotary shaft insert hole, stress that acts to expand the outside diameter of the rotor is produced. Stress that acts to expand the outside diameter of each of the main magnetic poles of the rotor is absorbed by the gap between the magnet insert hole and the permanent magnet and the gap between the semi-tubular rivet insert hole and the semi-tubular rivet. Further, stress that acts to expand the outside diameter of each of the auxiliary magnetic poles of the rotor is absorbed by the assigned passage hole. Further, the rotor is integrated by the semi-tubular rivets in a region radially outward of each of the magnet insert holes of the main magnetic poles. Therefore, the axial length of a region of the rotor which is located radially outward of the magnet insert hole of the main magnetic pole can be prevented from becoming longer.

An interlock may be provided in the main magnetic pole or the auxiliary magnetic pole and elongated in the radial direction of the rotor.

In the construction in which both the semi-tubular rivet insert hole and the interlock are formed in the same main magnetic pole or the same auxiliary magnetic pole, preferably, the interlock is disposed radially outward of the semi-tubular rivet insert hole or the passage hole in the rotor, particularly preferably in a radially outward region of the rotor.

An outer circumferential surface of the rotor may comprise first outer circumferential surface portions each having a first curve profile which intersects with a line (d-axis) connecting the center of the rotor and the center of the assigned main magnetic pole in the circumferential direction, and second outer circumferential surface portions each having a second curve profile which intersects with a line (q-axis) connecting the center of the rotor and the center of the assigned auxiliary magnetic pole in the circumferential direction.

The first and second curve profiles are formed such that the maximum width of a gap between the second outer circumferential surface portion and the inside surface of the stator is larger than the maximum width of a gap between the first outer circumferential surface portion and the inside surface of the stator. Typically, the first curve profile has a circular arc shape having its center of curvature on the d-axis, and the second curve profile has a circular arc shape having its center of curvature on the q-axis. The centers of curvature of the circular arc shapes of the first and second curve profiles may be on the same point or on different points. In the construction in which the circular arc shapes have the centers of curvature on different points, the radius of curvature of the second curve profile is larger than that of the first curve profile.

Further, a recess may be formed in the outer circumferential surface of the rotor and in a position to face an end wall of the magnet insert hole which is adjacent to the outer circumferential surface of the rotor. In the construction in which the outer circumferential surface of the rotor comprises first and second outer circumferential surface portions, the recess is formed in each of the second outer circumferential surface portions.

The permanent magnet rotating machine according to the present invention can be suitably used as a motor for driving a compressor, or as a motor to be installed in a motor vehicle, such as a motor for driving a motor vehicle and a motor for driving an apparatus installed in a motor vehicle (a door glass, a wiper, a seat, a steering, a door). It can also be used for other applications.

Other objects, features and advantages of the present invention will be readily understood after reading the following detailed description together with the accompanying drawings and the claims.

DETAILED DESCRIPTION OF THE INVENTION

Figure 1:
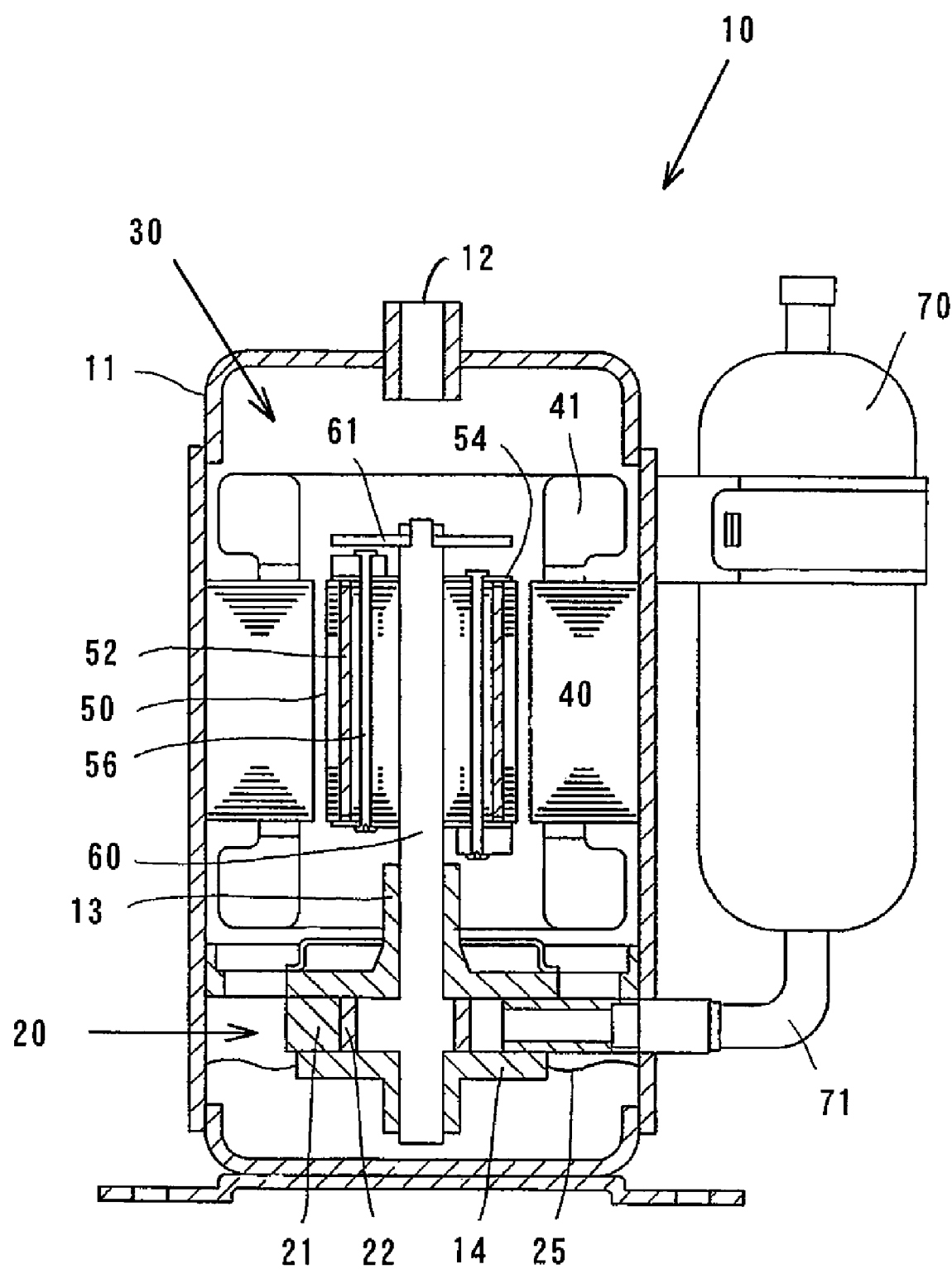
FIG. 1 is a longitudinal section showing a compressor using a permanent magnet motor according to a first embodiment of the invention.

The present invention covers a permanent magnet rotating machine including a stator with teeth and a rotor having magnet insert holes for receiving permanent magnets.

The rotor has main magnetic poles and auxiliary magnetic poles which alternate in the circumferential direction when viewed in cross section perpendicular to the axial direction of the rotor. A magnet insert hole is formed in each of the main magnetic poles. Typically, a rotor is formed as a laminate of a plurality of electrical steel sheets. In the construction in which the rotor is formed by laminating a plurality of electrical steel sheets, interlocks for locking the electrical steel sheets together and semi-tubular rivet insert holes for receiving semi-tubular rivets which are used for integrating the lamination are provided.

A rotary shaft insert hole for receiving a rotary shaft is formed in the rotor. The rotary shaft has an outside diameter larger than a bore diameter of the rotary shaft insert hole. The rotary shaft having an outside diameter larger than the bore diameter of the rotary shaft insert hole is inserted into the rotary shaft insert hole typically by shrink fitting or press fitting.

When the rotary shaft having an outside diameter larger than the bore diameter of the rotary shaft insert hole is inserted into the rotary shaft insert hole, stress that acts to expand the outside diameter of the rotor is produced. If the outside diameter of the rotor is expanded by this stress, the gap between the outside surface of the rotor and the inside surface of the stator may be unevenly narrowed. Or, if this stress is applied to the permanent magnet, the permanent magnet may be cracked or chipped. The object of the present invention is to reduce influence caused by the stress which is produced and acts to expand the outside diameter of the rotor when the rotary shaft is inserted into the rotary shaft insert hole. The stress to be produced when the rotary shaft is inserted into the rotary shaft insert hole includes the stress that acts to expand the outside diameter of each of the main magnetic poles of the rotor and stress that acts to expand the outside diameter of each of the auxiliary magnetic poles of the rotor. According to this invention, influence caused by the stress that acts to expand the outside diameter of the main magnetic pole of the rotor can be reduced, and influence caused by the stress that acts to expand the outside diameter of the auxiliary magnetic pole of the rotor can also be reduced.

In a first preferred embodiment, a permanent magnet is inserted into a magnet insert hole, typically by a clearance fit, such that a gap is formed between the magnet insert hole and the permanent magnet. For example, the permanent magnet has a cross section smaller than that of the magnet insert hole. In this case, the periphery of the permanent magnet and the bore of the magnet insert hole are shaped such that at least a gap is formed therebetween in a radial direction of the rotor. Thus, stress that acts to expand the outside diameter of the main magnetic pole is absorbed by the gap between the magnet insert hole and the permanent magnet. Therefore, the amount of expansion of the outside diameter of the main magnetic pole can be reduced, and the permanent magnet can be prevented from being cracked or chipped.

Further, in the auxiliary magnetic pole, a permanent magnet is not provided, but a semi-tubular rivet insert hole is provided. A semi-tubular rivet is inserted into the semi-tubular rivet insert hole, typically by a clearance fit, such that a gap is formed between the semi-tubular rivet insert hole and the semi-tubular rivet. For example, the semi-tubular rivet has a cross section smaller than that of the semi-tubular rivet insert hole. In this case, the periphery of the semi-tubular rivet and the bore of the semi-tubular rivet insert hole are shaped such that at least a gap is formed therebetween in a radial direction of the rotor. Thus, stress that acts to expand the outside diameter of the auxiliary magnetic pole is absorbed by the gap between the semi-tubular rivet insert hole and the semi-tubular rivet. Therefore, the amount of expansion of the outside diameter of the auxiliary magnetic pole can be reduced. Further, in the auxiliary magnetic pole in which the inside surface and the outside surface of the rotor are directly connected to each other without a magnet insert hole therebetween, the rotor is integrated by the semi-tubular rivet. Thus, the strength of the rotor can be increased.

In the first preferred embodiment, a passage hole may be provided in the auxiliary magnetic pole. The passage hole can be used as a passage for a medium such as a cooling medium and lubricating oil. In this case, the stress that acts to expand the outside diameter of the auxiliary magnetic pole is absorbed by the gap between the semi-tubular rivet insert hole and the semi-tubular rivet and by the passage hole.

Preferably, the passage hole is disposed radially inward of the semi-tubular rivet insert hole in the rotor. Particularly, the passage hole is preferably disposed in a radially inward region of the rotor. With this arrangement, the centrifugal force that acts upon the medium flowing through the passage hole can be reduced, so that the medium can easily flow through the passage hole.

In a second preferred embodiment, a magnet insert hole and a semi-tubular rivet insert hole are provided in the main magnetic pole. The semi-tubular rivet insert hole is disposed radially outward of the magnet insert hole. The permanent magnet is inserted into the magnet insert hole such that a gap is formed between the magnet insert hole and the permanent magnet. The semi-tubular rivet is inserted into the semi-tubular rivet insert hole such that a gap is formed between the semi-tubular rivet insert hole and the semi-tubular rivet. Thus, stress that acts to expand the outside diameter of the main magnetic pole is absorbed by the gap between the magnet insert hole and the permanent magnet and the gap between the semi-tubular rivet insert hole and the semi-tubular rivet. Therefore, the amount of expansion of the outside diameter of the main magnetic pole can be reduced, and the permanent magnet can be prevented from being cracked or chipped.

Further, the rotor is integrated by the semi-tubular rivet in a region radially outward of the magnet insert hole of the main magnetic pole. Therefore, the axial length of a region of the rotor which is located radially outward of the magnet insert hole of the main magnetic pole can be prevented from becoming longer.

A passage hole is provided in the auxiliary magnetic pole. Thus, stress that acts to expand the outside diameter of the auxiliary magnetic pole is absorbed by the passage hole. Therefore, the amount of expansion of the outside diameter of the auxiliary magnetic pole can be reduced.

In the first and second preferred embodiments, an interlock may be provided at least either in the main magnetic poles or in the auxiliary magnetic poles and elongated in the radial direction of the rotor. The interlock is formed by processing an electrical steel sheet. The interlock elongated in the radial direction of the rotor typically comprises a wedge-like projection which is inclined radially outward and inward in the axial direction. In this case, the stress that acts to expand the outside diameter of the main magnetic pole or the auxiliary magnetic pole of the rotor is also absorbed by the inclined portion of the interlock. In the construction in which the interlock is provided in the main magnetic pole, preferably, the interlock is disposed radially outward of the semi-tubular rivet insert hole in the main magnetic pole. With this arrangement, the amount of magnetic flux flowing through the radially outward region of the rotor, which may cause noise and vibration, can be reduced.

In the first and second preferred embodiments, an outer circumferential surface of the rotor may comprise first outer circumferential surface portions each having a first curve profile which intersects with a d-axis of the assigned main magnetic pole, and second outer circumferential surface portions each having a second curve profile which intersects with a q-axis of the assigned auxiliary magnetic pole. The first and second profiles bulge radially outward. Further, the maximum width of a gap between the second outer circumferential surface portion and the inside surface of the stator is larger than the maximum width of a gap between the first outer circumferential surface portion and the inside surface of the stator. Typically, the first curve profile has a circular arc shape having its center of curvature on the d-axis, and the second curve profile has a circular arc shape having its center of curvature on the q-axis. The centers of curvature of the circular arc shapes of the first and second curve profiles may be on the same point or on different points. In the construction in which the circular arc shapes have the centers of curvature on different points, the radius of curvature of the second curve profile is larger than that of the first curve profile. With this construction, even if the outer diameter of the auxiliary magnetic pole is expanded by the stress that acts to expand the outside diameter of the rotor, the gap between the outside surface of the rotor and the inside surface of the stator can be prevented from being unevenly narrowed.

Further, in the first and second preferred embodiments, a recess may be formed in the outer circumferential surface of the rotor and in a position to face an end wall of the magnet insert hole which is adjacent to the outer circumferential surface of the rotor. With this arrangement, magnetic flux generated at the permanent magnet can be prevented from being short-circuited via the teeth of the stator.

Each of the additional features and method steps disclosed above and below may be utilized separately or in conjunction with other features and method steps to provide improved permanent magnet rotating machines and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 2:
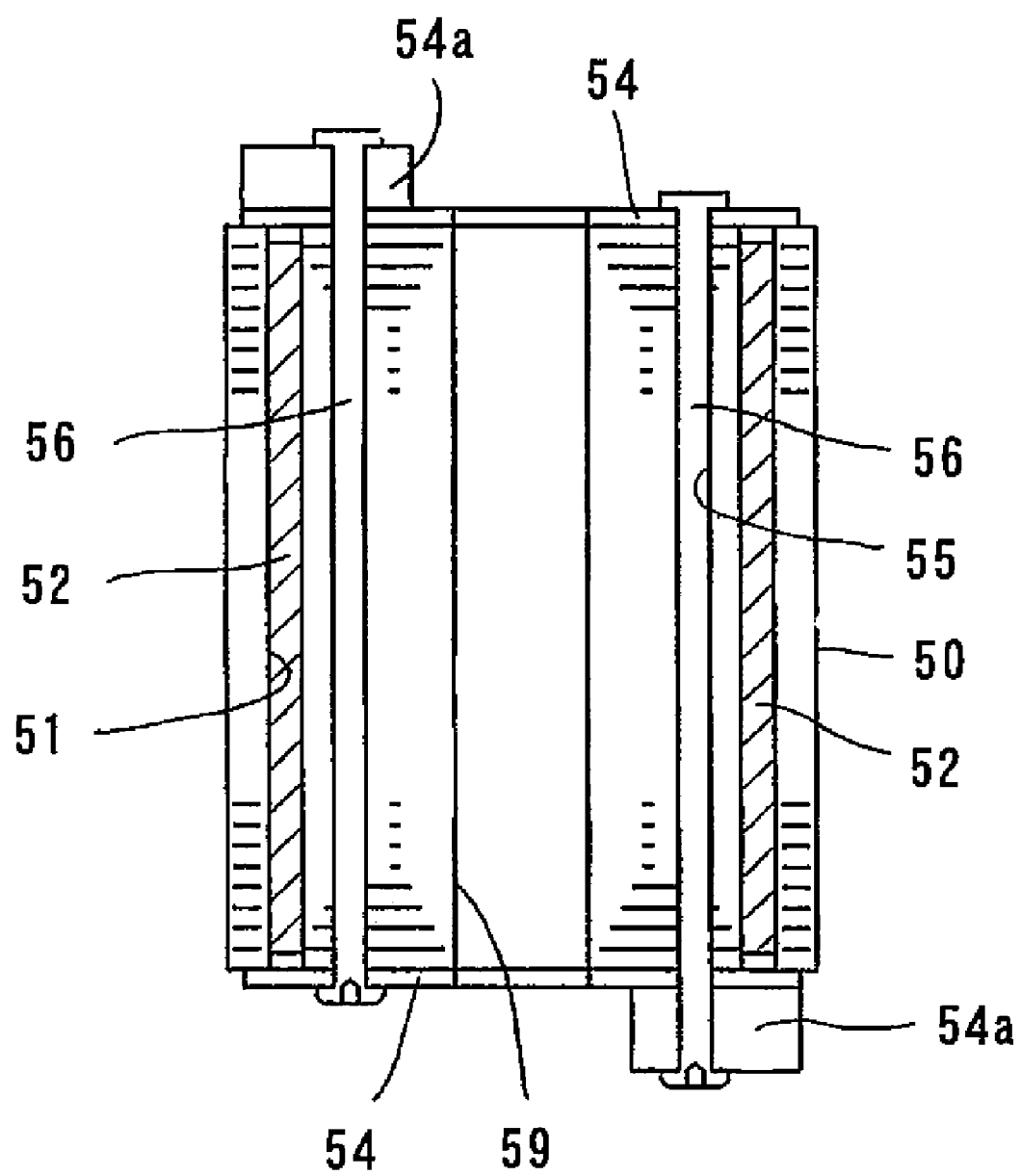
FIG. 2 is a longitudinal section of a rotor of the permanent magnet motor of the first embodiment.

FIGS. 1 and 2 show the construction of a compressor 10 using a permanent magnet motor 30 according to a first embodiment of the present invention. FIG. 1 is a longitudinal section of the compressor 10, and FIG. 2 is a longitudinal section of a rotor 50 of the permanent magnet motor 30 shown in FIG. 1. Permanent magnet motors according to other embodiments in the present invention can also be used in the compressor 10 shown in FIG. 1.

The compressor 10 includes a compression mechanism 20, the permanent magnet motor 30, and an accumulator 70. The compression mechanism 20 and the permanent magnet motor 30 are disposed within a closed container 11. A suction pipe 71 and a discharge pipe 12 are provided in the closed container 11.

The accumulator 70 separates a cooling medium (e.g. cooling gas) from lubricating oil. The cooling medium separated in the accumulator 70 is returned to the compression mechanism 20 via the suction pipe 71. Further, the lubricating oil separated in the accumulator 70 is returned to a lubricating oil reservoir 25.

The compression mechanism 20 includes a cylinder 21 and an eccentric rotor 22 driven by the rotating shaft 60. The compression mechanism 20 compresses the cooling medium sucked through the suction pipe 71, by rotation of the eccentric rotor 22 within the cylinder 21.

The cooling medium compressed in the compression mechanism 20 is discharged from the discharge pipe 12 via a passage (a groove, a hole, a recess) formed in the stator 40, a passage hole formed in the rotor 50, and a gap between the stator 40 and the rotor 50 in the permanent magnet motor 30.

Further, the lubricating oil stored in the lubricating oil reservoir 25 is supplied to a sliding section of the compression mechanism 20 by rotation of the rotary shaft 60. The lubricating oil lubricates the sliding section and is then returned to the lubricating oil reservoir 25.

In the compressor 10 shown in FIG. 1, a mixed medium of the cooling medium and the lubricating oil is discharged from the discharge pipe 12.

The permanent magnet motor 30 includes the stator 40 and the rotor 50.

Figure 3:
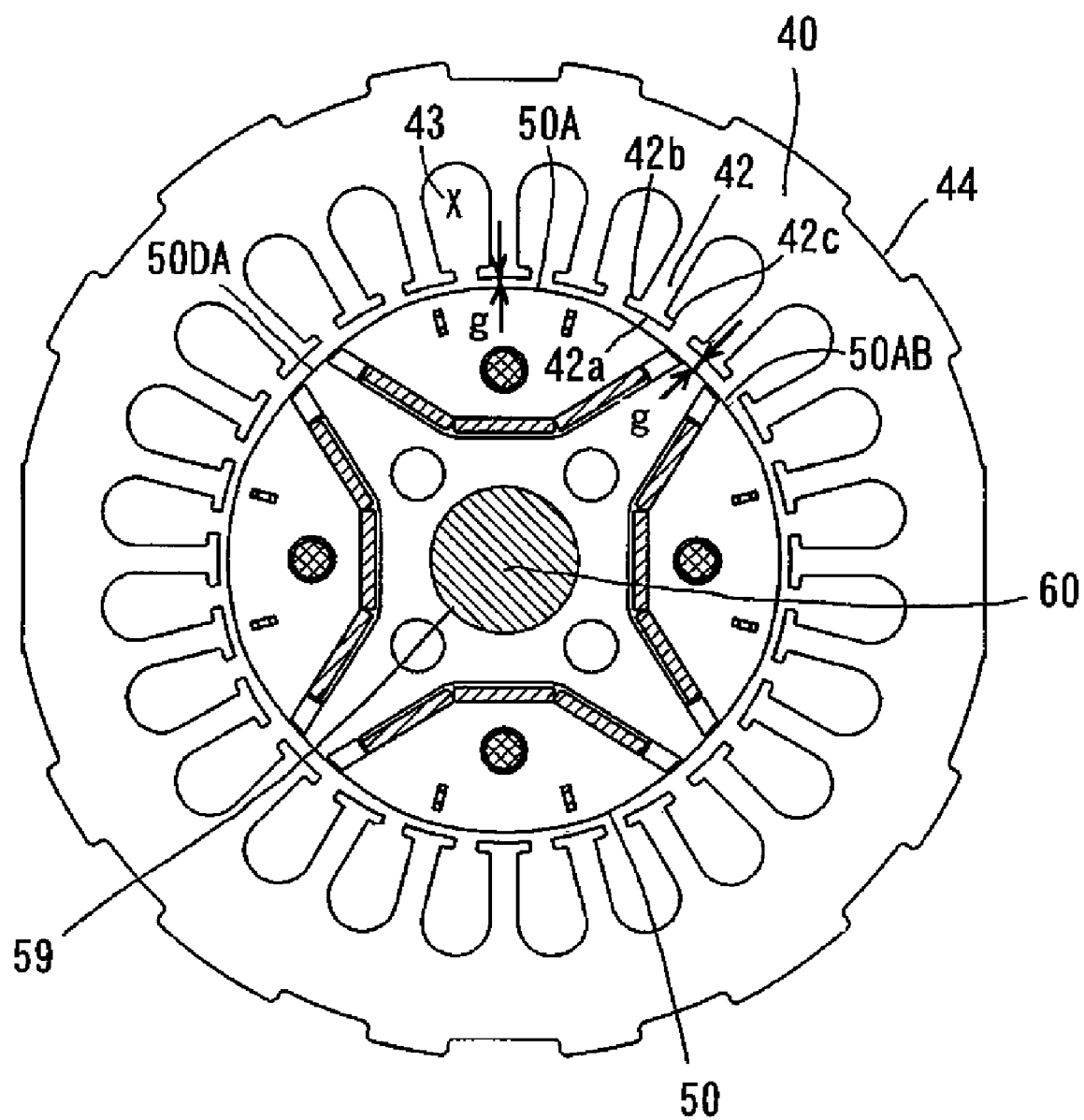
FIG. 3 is a cross section of a stator and the rotor of the permanent magnet motor of the first embodiment.

The stator 40 of the present embodiment is formed by laminating a plurality of electrical steel sheets. As shown in FIG. 3, the stator 40 has teeth 42 on the inner circumferential surface and recesses 44 on the outer circumferential surface. The outer circumferential shape of the stator 40 is appropriately determined. Each of the teeth 42 has a top portion having teeth end portions 42b, 42c on the opposite sides in the circumferential direction, and a teeth top surface 42a is formed between the teeth end portions 42b and 42c on the side opposed to the outer circumferential surface of the rotor 50. The recesses 44 of the stator 40 form passages for the cooling medium compressed in the compression mechanism 20.

The teeth 42 of the stator 40 form slots 43. A stator coil 41 (see FIG. 1) is held within the slots 43 typically by distributed winding or concentrated winding.

The rotor 50 is cylindrical and rotatably disposed in the inside of the stator 40. A gap between the outer circumferential surface of the rotor 50 and the teeth top surfaces 42a of the teeth 42 of the stator 40 is set within a predetermined range.

The rotor 50 is formed by laminating a plurality of electrical steel sheets. As shown in FIG. 2, a rotary shaft insert hole 59, magnet insert holes 51 and semi-tubular rivet insert holes 55 are formed in the rotor 50 and extend in the axial direction.

Further, although not shown in FIG. 2, the rotor 50 of this embodiment has a passage hole (e.g. 58ab, 58da in FIG. 4) extending in its axial direction.

The rotary shaft 60 is inserted into the rotary shaft insert hole 59. In this embodiment, the outside diameter of the rotary shaft 60 is larger than the bore diameter of the rotary shaft insert hole 59. The difference between the outside diameter of the rotary shaft 60 and the bore diameter of the rotary shaft insert hole 59 is referred to as "shrinking ratio".

The rotary shaft 60 having an outside diameter larger than the bore diameter of the rotary shaft insert hole 59 is inserted into the rotary shaft insert hole 59, for example, by using the press fitting or shrink fitting method. In the shrink fitting method, as mentioned above, the rotor 50 is heated and then the rotary shaft 60 is inserted into the rotary shaft insert hole 59. In the press fitting method, as mentioned above, the rotary shaft 60 is inserted into the rotary shaft insert hole 59 by applying a strong force to the rotary shaft 60.

Permanent magnets 52 are inserted into magnet insert holes 51. End plates 54 are disposed on the both axial ends of the laminate. The end plates 54 and the laminate are integrated by semi-tubular rivets 56 inserted into semi-tubular rivet insert holes 55. Designated by reference numeral 54a is a balance weight for adjusting the balance of the rotor 50. Further, interlocks are formed on the electrical steel sheets to lock the electrical steel sheets together when laminated.

First Embodiment

Figure 4:
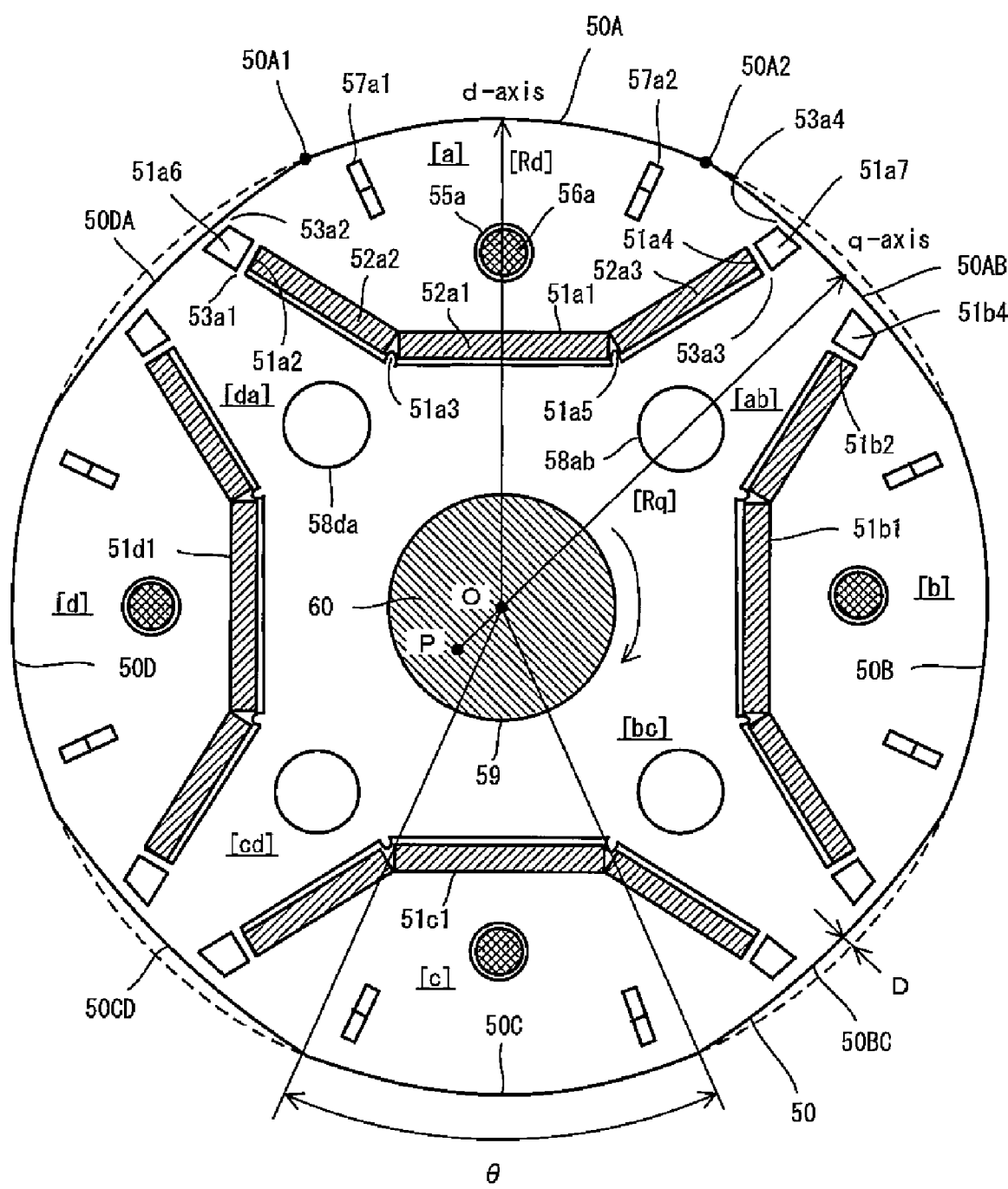
FIG. 4 is a cross section of the rotor of the permanent magnet motor of the first embodiment.

Next, the construction of the rotor 50 of the permanent magnet motor 30 of the first embodiment will be explained in further detail with reference to FIGS. 3 and 4. FIG. 3 is a cross section of the stator 40 and the rotor 50 as viewed from the direction perpendicular to the axial direction. FIG. 4 is a cross section of the rotor 50 as viewed from the direction perpendicular to the axial direction.

In this embodiment, the rotor 50 having four poles (two pairs of poles) and the stator 40 having the construction shown in FIGS. 1 and 3 are used. This is the same with other embodiments in this invention which will be described below.

In the rotor 50, main magnetic poles and auxiliary magnetic poles alternate in the circumferential direction when viewed in cross section (perpendicular to the axial direction). Magnet insert holes are provided in the main magnetic poles.

In the following description, the main magnetic poles are represented by main magnetic poles [a], [b], [c], [d] and the auxiliary magnetic poles are represented by auxiliary magnetic poles [ab], [bc], [cd], [da]. Elements provided in the main magnetic poles [a] to [d] are indicated using reference symbols a to d or A to D, and elements provided in the auxiliary magnetic poles [ab] to [da] are indicated but using reference symbols ab to da or AB to DA. The main magnetic poles [a] to [d] and the auxiliary magnetic poles [ab] to [da] have the same constructions, respectively. Therefore, mainly, the main magnetic pole [a] and the auxiliary magnetic poles [da] and [ab] located on the both sides of the main magnetic pole [a] in the circumferential direction will now be explained.

The alternate placement of the main magnetic poles [a] to [d] and the auxiliary magnetic poles [ab] to [da] in the circumferential direction permits use both of magnet torque which is produced by magnetic flux of the permanent magnets inserted into the magnet insert holes and of reluctance torque which is produced by saliency of the auxiliary magnetic poles [ab] to [da]. The reluctance torque can be adjusted by adjusting the width of the magnetic flux passage of the auxiliary magnetic poles [ab] to [da].

Further, in the following description, a line connecting the center of the rotary shaft insert hole (center O of the rotor) and the center of each of the main magnetic poles [a] to [d] in the circumferential direction will be referred to as a "center line of the main magnetic pole" or "d-axis". A line connecting the center of the rotary shaft insert hole (center O of the rotor) and the center of each of the auxiliary magnetic poles [ab] to [da] in the circumferential direction will be referred to as a "center line of the auxiliary magnetic pole" or "q-axis".

The rotary shaft insert hole 59 is provided in the center of the rotor 50. The outer circumferential surface of the rotor 50 comprises first outer circumferential surface portions 50A to 50D each having a first curve profile and assigned to the main magnetic poles [a] to [d], and second outer circumferential surface portions 50AB to 50DA each having a second curve profile and assigned to the auxiliary magnetic poles [ab] to [da]. The curve profile of the first outer circumferential surface portions 50A to 50D and the curve profile of the second outer circumferential surface portions 50AB to 50DA will be described below.

Trapezoidal magnet insert holes 51a1 to 51d1 are provided in the main magnetic poles [a] to [d] of the rotor 50. The trapezoidal shape is formed to bulge in the radially inward direction (or to be recessed in the radially outward direction).

A permanent magnet is inserted into the magnet insert hole 51a1. In this embodiment, three permanent magnets 52a1 to 52a3 each having a rectangular cross section (taken in a direction perpendicular to the axial direction) are inserted into the magnet insert hole 51a1. Projections 51a3 and 51a5 are formed on the magnet insert hole 51a1 and protrude inward. The projections 51a3, 51a5 serve to position the permanent magnets 52a1 to 52a3 within the magnet insert hole 51a1.

Further, the permanent magnets 52a1 to 52a3 are inserted into the magnet insert hole 51a1 such that a gap is formed between the permanent magnets 52a1 to 52a3 and the magnet insert hole 51a1. This can be effected by a clearance fit. For example, the inner circumferential surface of the magnet insert hole 51a1 and the outer circumferential surface of the permanent magnets 52a1 to 52a3 is configured and shaped in cross section such that a gap is formed between the permanent magnets 52a1 to 52a3 and the magnet insert hole 51a1 when the permanent magnets 52a1 to 52a3 are inserted into the magnet insert hole 51a1. The gap is formed at least in the radial direction of the rotor 50.

Ferrite magnets or rare earth magnets are used as the permanent magnets. In view of ease of manufacturing, it is preferable to use permanent magnets having a rectangular cross section (taken in a direction perpendicular to the axial direction), but permanent magnets varying in shape can also be used. Further, the number of the permanent magnets to be inserted into the magnet insert hole can be appropriately selected.

Insertion of the permanent magnets 52a1 to 52a3 into the magnet insert hole 51a1 can be more easily attained by clearance fit than by press fitting or shrink fitting. Therefore, the permanent magnets 52a1 to 52a3 can be prevented from being cracked or chipped. Further, any special equipment is not required for this purpose.

When the rotary shaft 60 is inserted into the rotary shaft insert hole 59, stress that acts to expand the outside diameter of the main magnetic pole [a] is produced. In this embodiment, the stress is absorbed by the gap between the magnet insert hole 51a1 and the permanent magnets 52a1 to 52a3. Therefore, the amount by which the outside diameter of the main magnetic pole [a] expands when the rotary shaft 60 is inserted into the rotary shaft insert hole 59 can be reduced.

The area of the cross section (taken in a direction perpendicular to the axial direction) of the permanent magnets 52a1 to 52a3 has an influence on the magnitude of the magnet torque. Therefore, preferably, the gap between the magnet insert hole 51a1 and the permanent magnets 52a1 to 52a3 is designed to be as small as possible within a range in which the amount of expansion of the outside diameter of the main magnetic pole [a] can be reduced.

Further, the stress that acts to expand the outside diameter of the rotor is also produced in the state in which the rotary shaft is inserted in the rotary shaft insert hole. In this specification, the description "the stress produced when the rotary shaft is inserted into the rotary shaft insert hole" is used as including "the stress produced in the state in which the rotary shaft is inserted in the rotary shaft insert hole.

The permanent magnets are inserted into the magnet insert holes 51a1 to 51d1 of the main magnetic poles [a] to [d] and magnetized such that adjacent main magnetic poles have different polarities with respect to each other. Thus, the north and south main magnetic poles alternate in the circumferential direction. In order to magnetize the permanent magnets, for example, the rotary shaft 60 is inserted into the rotary shaft insert hole 59 of the rotor 50 and then magnetizing current is passed through the stator coil 41 of the stator 40 which faces the rotor 50.

Spaces (non-magnetic regions) 51a6, 51a7 are provided between end walls (outer end walls) 51a2, 51a4 of the magnet insert hole 51a1 which are adjacent to the outer circumferential surface of the rotor and the outer circumferential surface (the second outer circumferential surface 50DA, 50AB in FIG. 4) of the rotor 50. The spaces 51a6, 51a7 are formed as holes, or recesses formed in the outer circumferential surface of the rotor. Further, the spaces 51a6, 51a7 may be filled with non-magnetic material. Provision of the spaces 51a6, 51a7 between the outer end walls 51a2, 51a4 of the magnet insert hole 51a1 and the outer circumferential surface of the rotor 50 can prevent leakage of magnetic flux of the permanent magnets in the magnet insert hole 51a1.

Bridges 53a1, 53a3 are provided between the outer end walls 51a2, 51a4 of the magnet insert hole 5a1 and the spaces 51a6, 51a7. Further, bridges 53a2, 53a4 are provided between the spaces 51a6, 51a7 and the outer circumferential surface 50DA, 50AB of the rotor 50. By provision of the bridges 53a1, 53a3, 53a2, 53a4 between the outer end walls 51a2, 51a4 of the magnet insert hole 51a1 and the outer circumferential surface of the rotor 50, the strength of the rotor 50 against centrifugal force can be increased.

The shape of the spaces 51a6, 51a7 and the method of forming the spaces 51a6, 51a7 can be appropriately changed.

For example, the bridges 5a1, 53a3 may be eliminated and positioning parts for positioning the permanent magnets 52a2, 52a3 may be provided in order to form spaces on the outer ends within the magnet insert hole 51a1. The positioning parts may comprise projections similar to the projections 51a3, 51a5.

A semi-tubular rivet insert hole 55a is formed in the main magnetic pole [a] and located radially outward of the magnet insert hole 51a1. The semi-tubular rivet insert hole 55a is formed on the center line (d-axis) of the main magnetic pole [a]. A semi-tubular rivet 56a for integrating the laminate and the end plate 54 as described above is inserted into the semi-tubular rivet insert hole 55a.

In this embodiment, the semi-tubular rivet 56a is inserted into the semi-tubular rivet insert hole 55a such that a gap is formed between the semi-tubular rivet 56a and the semi-tubular rivet insert hole 55a. Such insertion can be effected by a clearance fit. For example, the inner circumferential surface of the semi-tubular rivet insert hole 55a and the outer circumferential surface of the semi-tubular rivet 56a is configured and shaped in cross section such that a gap is formed between the semi-tubular rivet 56a and the semi-tubular rivet insert hole 55a when the semi-tubular rivet 56a is inserted into the semi-tubular rivet insert hole 55a. Typically, the outside diameter of the semi-tubular rivet 56a is smaller than the bore diameter of the semi-tubular rivet insert hole 55a. It is only necessary for the gap to be formed at least in the radial direction of the rotor 50 between the semi-tubular rivet 56a and the semi-tubular rivet insert hole 55a.

When the rotary shaft 60 is inserted into the rotary shaft insert hole 59, stress that acts to expand the outside diameter of the main magnetic pole [a] is produced. In this embodiment, the stress is absorbed by the gap between the semi-tubular rivet 56a and the semi-tubular rivet insert hole 55a. Therefore, the amount of expansion of the outside diameter of the main magnetic pole [a] can be reduced. Preferably, the gap between the semi-tubular rivet 56a and the semi-tubular rivet insert hole 55a is designed to be as small as possible within a range in which the amount of expansion of the outside diameter of the main magnetic pole [a] can be reduced.

When the rotor 50 is formed by laminating a plurality of electrical steel sheets, in some cases, the axial length of a region located radially outward of the magnet insert hole 51a1 of the main magnetic pole [a] may be longer. In this embodiment, the semi-tubular rivet insert hole 55a is formed in a position radially outward of the magnet insert hole 51a1 of the main magnetic pole [a] and the main magnetic pole [a] is riveted in the position radially outward of the magnet insert hole 51a1 by the semi-tubular rivet 56a. Therefore, the axial length of a region of the rotor 50 which is located radially outward of the magnet insert hole 51a1 of the main magnetic pole [a] can be prevented from becoming longer. Preferably, the semi-tubular rivet insert hole 55a is formed on the center line (d-axis) of the main magnetic pole [a].

Further, with the configuration in which the semi-tubular rivet insert hole 55a and the semi-tubular rivet 56a are disposed radially outward of the magnet insert hole 51a1, the magnetic resistance can be increased in a region radially outward of the magnet insert hole 51a1. As a result, the magnetic flux flowing through the position radially outward of the magnet insert hole 51a1 can be reduced, and noise and vibration can be reduced.

Further, interlocks 57a1, 57a2 are disposed radially outward of the magnet insert hole 51a1 and the semi-tubular rivet insert hole 55a and arranged on the both sides (symmetrically) in the circumferential direction with respect to the center line (d-axis) of the main magnetic pole [a]. The interlocks 57a1, 57a2 are used to lock the electrical steel sheets together when laminated. Typically, the interlocks are formed by processing electrical steel sheets and comprise projections having an uneven surface.

In this embodiment, each of the interlocks 57a1, 57a2 is elongated in the radial direction of the rotor and comprises a wedge-like projection which is inclined radially outward in the inner portion and inward in the outer portion in the axial direction.

When the rotary shaft 60 is inserted into the rotary shaft insert hole 59, stress that acts to expand the outside diameter of the main magnetic pole [a] is produced. In this embodiment, the stress is absorbed by the inclined portions of the radially elongated interlocks 57a1, 57a2. Therefore, the amount of expansion of the outside diameter of the main magnetic pole [a] can be reduced.

In some cases, magnetic flux by higher harmonics may flow through the radially outward region of the rotor 50 due to the slots 43 of the stator 40 or due to use of a PWM (pulse width modulation) controlled inverter In such a case, iron loss increases and the motor performance is deteriorated. The magnetic flux by higher harmonics can be reduced by increasing the magnetic resistance of the radially outward region of the rotor.

The interlocks 57a1, 57a2 are typically formed by processing electrical steel sheets. Therefore, the amount of increase of the magnetic resistance by provision of the interlocks 57a1, 57a2 is larger than the amount of increase of the magnetic resistance by provision of the semi-tubular rivet insert hole 55a.

Therefore, by providing the interlocks 57a1, 57a2 radially outward of the semi-tubular rivet insert hole 55a, magnetic flux by higher harmonics which flows through the radially outward region of the rotor 50 can be reduced compared with the case in which the semi-tubular rivet insert hole 55a is provided radially outward of the interlocks 57a1, 57a2. As a result, the iron loss due to the magnetic flux by higher harmonics can be further reduced.

Further, with the construction in which the components are disposed in a radially outward region of the rotor, influence by centrifugal force increases compared with the case in which the components are disposed in a radially inward region of the rotor. Therefore, in order to reduce the influence by centrifugal force, it is preferable to dispose the components in a radially inward region of the rotor.

In order to provide the interlocks 57a1, 57a2, it is only necessary to form the interlocks on the electrical steel sheets. Therefore, by disposing the interlocks 57a1, 57a2 radially outward of the semi-tubular rivet insert hole 55a, the number of components disposed on the radially outward region of the rotor can be reduced compared with the case in which the semi-tubular rivet insert hole 55a is disposed radially outward of the interlocks 57a1, 57a2. As a result, influence by centrifugal force can be reduced.

Further, in this embodiment, the interlocks 57a1, 57a2 are disposed on the both sides in the circumferential direction with respect to the center line (d-axis) of the main magnetic pole [a]. As a result, concentration of magnetic flux on the central portion of the main magnetic pole [a] can be prevented from being inhibited by the interlocks 57a1, 57a2. Therefore, reduction in the motor efficiency can be prevented.

In this embodiment, passage holes 58ab, 58da are disposed in the auxiliary magnetic poles [ab], [da] of the rotor 50 in a radially inward region of the rotor 50. The passage holes 58ab, 58da axially extend through the rotor 50 and are located on the center line (q-axis) of the auxiliary magnetic poles [ab], [da].

The manner of being "disposed in a radially inward region of the rotor 50" means the manner of being disposed radially inward of the midpoint in the radial extent of the rotor 50 (between the inside surface and the outside surface of the rotor). The manner of being "disposed in a radially outward region of the rotor 50" means the manner of being disposed radially outward of the midpoint in the radial extent of the rotor 50.

In this embodiment, the passage holes 58ab, 58da are used as passages for a medium such as a cooling medium and lubricating oil.

When the rotary shaft 60 is inserted into the rotary shaft insert hole 59, stress that acts to expand the outside diameter of the auxiliary magnetic poles [ab], [da] is produced. In this embodiment, the stress is absorbed by the bore space of the passage holes 58ab, 58da. Therefore, the amount of expansion of the outside diameter of the auxiliary magnetic poles [ab], [da] can be reduced.

Further, by disposing the passage holes 58ab, 58da in a radially inward region of the rotor 50, the centrifugal force that acts upon a medium (cooling medium, lubricating oil, etc.) flowing through the passage holes 58ab, 58da can be reduced compared with the case in which the passage holes 58ab, 58da are disposed in a radially outward region of the rotor 50. As a result, the fluid resistance of the medium flowing through the passage holes 58ab, 58da can be reduced, so that the medium can easily flow through the passage holes 58ab, 58da.

As described above, when the rotary shaft 60 having an outside diameter larger than the bore diameter of the rotary shaft insert hole 59 is inserted into the rotary shaft insert hole 59, the outside diameter of the rotor 50 expands. At this time, the gap between the outside surface of the rotor 50 and the inside surface of the stator 40 (the teeth top surface 42a) is narrowed, so that the magnetic flux flowing through the gap increases. In this case, if the upper limit of the supply voltage to the stator coil 41 of the permanent magnet motor 30 is fixed, the maximum rotational speed of the permanent magnet motor 30 will be reduced. Further, in some specifications, the iron loss may increase and the motor performance may be deteriorated, compared with permanent magnet motors of the same rotational speed and of the same torque.

Further, when the magnetic flux by higher harmonics which flows through the radially outward region of the rotor 50 increases due to expansion of the outside diameter of the rotor 50, the iron loss increases and thus the motor efficiency is reduced.

Further, if the gap between the outside surface of the rotor 50 and the inside surface of the stator 40 is unevenly narrowed, noise and vibration may increase. Further, in some situations, the outside surface of the rotor 50 may come into contact with the inside surface of the stator 40.

The amount of expansion of the outside diameter of the auxiliary magnetic poles [ab], [da] due to stress which is produced by insertion of the rotary shaft into the rotary shaft insert hole 59, is larger than the amount of expansion of the outside diameter of the main magnetic pole [a] in which permanent magnets are disposed. Therefore, this stress may not be adequately absorbed by the passage holes 58ab, 58da formed in the auxiliary magnetic poles [ab], [da].

Therefore, the outer circumferential surface portions 50AB, 50DA (which intersect with the q-axis of the auxiliary magnetic poles [ab], [da]) assigned to the auxiliary magnetic poles [ab], [da] is shaped differently from the outer circumferential surface portion 50A (which intersects with the d-axis of the main magnetic poles [a]) assigned to the main magnetic pole [a]. In this embodiment, the maximum distance between the center O of the rotor 50 and the outer circumferential surface portions 50AB, 50DA is smaller than the maximum distance between the center O of the rotor 50 and the outer circumferential surface portion 50A. In other words, the maximum width of a gap g (see FIG. 3) between the outer circumferential surface portions 50AB, 50DA and the inside surface of the stator 40 (the teeth top surface 42a) is larger than the maximum width of the gap g between the outer circumferential surface portion 50A and the inside surface of the stator 40.

The outer circumferential surface portion 50A assigned to the main magnetic pole [a] has a circular arc shape having its center of curvature on the center line (d-axis) of the main magnetic pole [a]. In this embodiment, the outer circumferential surface portion 50A has a circular arc shape having its center of curvature on a point O (center of the rotor 50) on the d-axis of the main magnetic pole [a] and having a radius Rd. Further, each of the outer circumferential surface portions 50AB, 50DA assigned to the auxiliary magnetic poles [ab], [da] has a circular arc shape having its center of curvature on the center line (q-axis) of the assigned auxiliary magnetic pole [ab] or [da]. In this embodiment, each of the outer circumferential surface portions 50AB, 50DA has a circular arc shape having its center of curvature on a point P and having a radius Rq larger than the radius Rd. The point P is located on the q-axis of the assigned auxiliary magnetic pole [ab] or [da] and displaced from the point O (center of the rotor 50) away from the assigned outer circumferential surface portion 50AB or 50DA.

In this embodiment, the maximum width of the gap between the outer circumferential surface portions 50AB, 50DA assigned to the auxiliary magnetic poles [ab], [da] and the inside surface of the stator 40 is larger than the maximum width of the gap between the outer circumferential surface portion 50A assigned to the main magnetic pole [a] and the inside surface of the stator 40. With this construction, even if the outer diameter of the auxiliary magnetic poles [ab], [da] is expanded by the stress produced during insertion of the rotary shaft 60 into the rotary shaft insert hole 59, the gap between the outside surface of the rotor 50 and the inside surface of the stator 40 can be prevented from being unevenly narrowed. Therefore, cogging torque which is produced due to unevenness of the gap between the outside surface of the rotor 50 and the inside surface of the stator 40, can be reduced. Further, noise and vibration caused due to the cogging torque can also be reduced.

The circumferential width (represented by the angle θ or circumferential extent) of the outer circumferential surface portion 50A or the circumferential width (represented by the angle or circumferential extent) of the outer circumferential surface portion 50AB can be appropriately selected. Further, the outer circumferential surface portions 50A, 50B and 50AB are formed such that the outer circumferential surface portion 50AB is located in a position opposed to the adjacent outer end walls 51a4, 51b2 of the magnet insert holes 51a1, 51b1 of the adjacent main magnetic poles [a], [b].

Recently, a sensorless control system is used as a control system of the permanent magnet motor. In this sensorless control system, the position of the rotor is detected by using the input voltage and input current, assuming that the induced electromotive force has a sinusoidal waveform. In the sensorless control system, the accuracy of detecting the rotor position drops off as harmonic components contained in the waveform of the induced electromotive force increase. When the rotor position detecting accuracy drops off, an optimum control cannot be achieved, and thus the motor efficiency is reduced.

In this embodiment, the radius of curvature of the outer circumferential surface portions 50AB, 50DA assigned to the auxiliary magnetic poles [ab], [da] is larger than the radius of curvature of the outer circumferential surface portion 50A assigned to the main magnetic pole [a]. Thus, the contour of the outer surface of the rotor 50 is not significantly changed at the boundaries between the outer circumferential surface portion 50A and the outer circumferential surface portions 50AB, 50DA. Therefore, the flow of the magnetic flux through the teeth 42 can be prevented from being abruptly changed when the boundaries between the outer circumferential surface portion 50A and the outer circumferential surface portions 50AB, 50DA pass by the teeth 42 of the stator 40. As a result, increase of the harmonic components contained in the induced electromotive force of the stator winding 41 is prevented. Therefore, even when the permanent magnet motor is controlled by using the sensorless control system, optimum control can be achieved and the efficiency of the permanent magnet motor can be improved.

In this embodiment, the outer circumferential surface portions 50A to 50D assigned to the main magnetic poles [a] to [d] are features that correspond to the "first outer circumferential surface portions each having a first curve profile" according to this invention. Further, the outer circumferential surface portions 50AB to 50DA assigned to the auxiliary magnetic poles [ab] to [da] are features that correspond to the "second outer circumferential surface portions each having a second curve profile" according to this invention.

The curve profile of the outer circumferential surface portions 50A to 50D assigned to the main magnetic poles [a] to [d] and the curve profile of the outer circumferential surface portions 50AB to 50DA assigned to the auxiliary magnetic poles [ab] to [da] are not limited to the circular arc shape.

In this embodiment, the permanent magnets 52a1 to 52a3 are inserted into the magnet insert hole 51a1 in the main magnetic pole [a] such that a gap is formed between the magnet insert hole 51a1 and the permanent magnets 52a1 to 52a3. Further, the semi-tubular rivet 56a is inserted into the semi-tubular rivet insert hole 55a in the main magnetic pole [a] such that a gap is formed between the semi-tubular rivet 56a and the semi-tubular rivet insert hole 55a. Further, the interlocks 57a1, 57a2 elongated in the radial direction of the rotor 50 is provided in the main magnetic pole [a].

With such construction, stress which is produced when the rotary shaft 60 is inserted into the rotary shaft insert hole 59 and which acts to expand the outside diameter of the main magnetic pole [a], is absorbed by the gap between the magnet insert hole 51a1 and the permanent magnets 52a1 to 52a3, the gap between the semi-tubular rivet 56a and the semi-tubular rivet insert hole 55a, and the interlocks 57a1, 57a2. Therefore, the amount of expansion of the outside diameter of the main magnetic pole [a] can be reduced.

Further, the passage holes 58ab, 58da are disposed in the auxiliary magnetic poles [ab], [da]. Stress which is produced when the rotary shaft 60 is inserted into the rotary shaft insert hole 59 and which acts to expand the outside diameter of the auxiliary magnetic poles [ab], [da], is absorbed by the passage holes 58ab, 58da. Therefore, the amount of expansion of the outside diameter of the auxiliary magnetic poles [ab], [da] can be reduced.

Further, the outer circumferential surface of the rotor 50 comprises the first outer circumferential surface portion 50A having the first curve profile which intersects with the d-axis of the main magnetic pole [a], and the second outer circumferential surface portions 50AB, 50DA each having the second curve profile which intersects with the q-axis of the assigned auxiliary magnetic pole [ab] or [da]. Further, the maximum width of the gap between the second outer circumferential surface portions 50AB, 50DA and the inside surface of the stator 40 is larger than the maximum width of the gap between the first outer circumferential surface portion 50A and the inside surface of the stator 40.

With this construction, even if the outer diameter of the auxiliary magnetic poles [ab], [da] is expanded by the stress produced during insertion of the rotary shaft 60 into the rotary shaft insert hole 59, the gap between the outside surface of the rotor 50 and the inside surface of the stator 40 can be prevented from being narrowed.

With the construction as described above, the motor performance can be improved, and the permanent magnets can be prevented from being cracked or chipped, and generation of noise and vibration can be reduced or prevented.

Further, the radius of curvature of the second outer circumferential surface portions 50AB, 50DA is larger than the radius of curvature of the first outer circumferential surface portion 50A. With this configuration, the contour of the outer circumferential surface of the rotor 50 is prevented from being significantly changed at the boundaries between the outer circumferential surface portion 50A and the outer circumferential surface portions 50AB, 50DA. Therefore, the flow of the magnetic flux through the teeth 42 of the stator 40 can be prevented from being abruptly changed, so that the harmonic components contained in the induced electromotive force of the stator winding 41 can be reduced.

Further, the semi-tubular rivet insert hole 55a and the interlocks 57a1, 57a2 are formed in the main magnetic pole [a] and located radially outward of the magnet insert hole 51a1. With this configuration, the magnetic resistance can be increased in a region of the main magnetic pole [a] which is located radially outward of the magnet insert hole 51a1. Therefore, the magnetic flux flowing through the radially outward region of the rotor 50 can be reduced, and noise and vibration caused by the magnetic flux flowing through the radially outward region of the rotor 50 can be reduced.

Further, the semi-tubular rivet insert hole 55a is disposed radially outward of the magnet insert hole 51a1. With this configuration, the axial length of a region of the rotor 50 which is located radially outward of the magnet insert hole 51a1 can be prevented from becoming longer.

Further, the interlocks 57a1, 57a2 are disposed radially outward of the semi-tubular rivet insert hole 55a. With this configuration, the magnetic flux by higher harmonics which flows through the radially outward region of the rotor 50 can be reduced, and thus the iron loss of the rotor 50 can be reduced.

Second Embodiment

Figure 5:
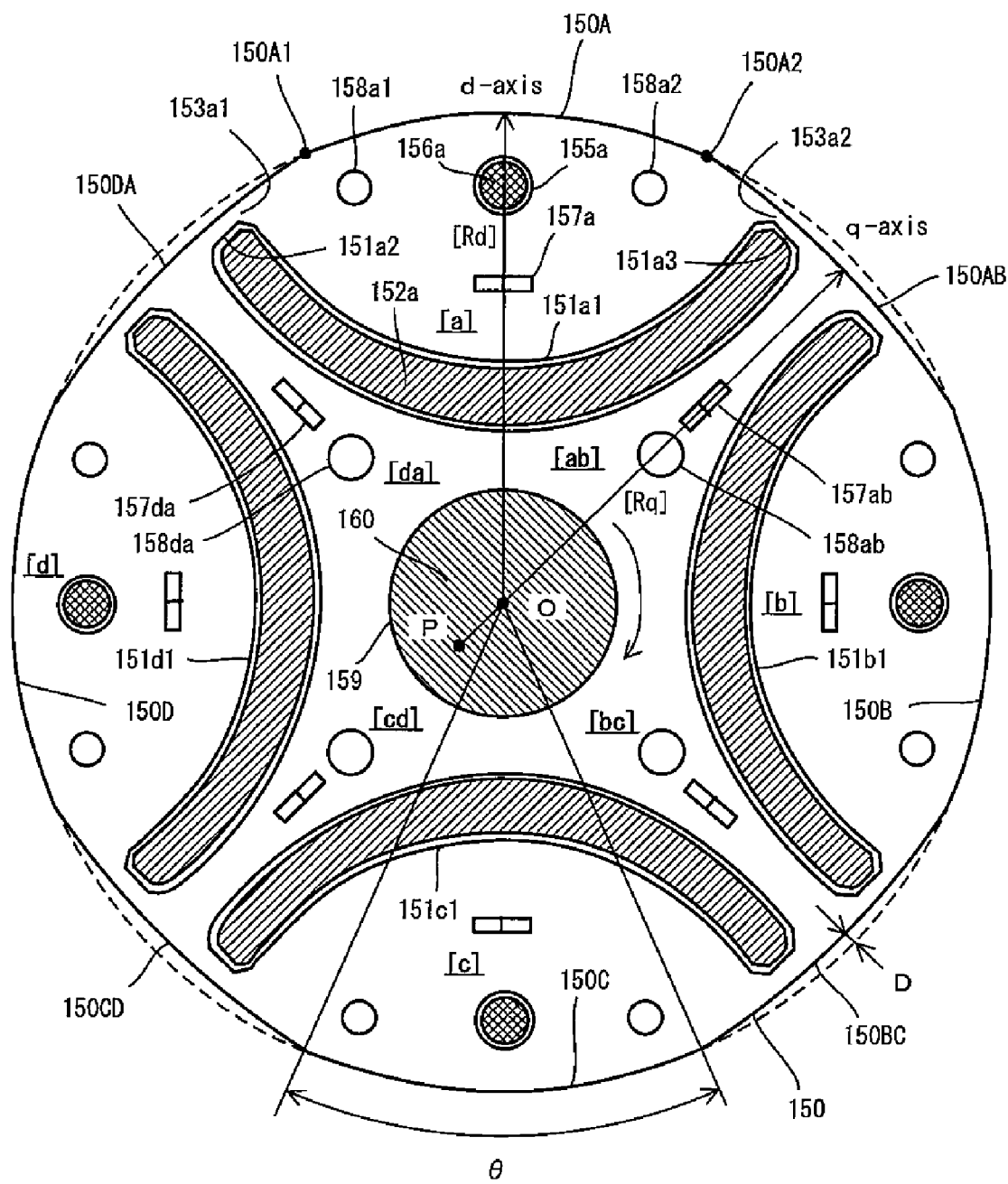
FIG. 5 is a cross section of a rotor of a permanent magnet motor according to a second embodiment.

FIG. 5 is a cross section showing a rotor 150 of a permanent magnet motor according to a second embodiment.

A rotary shaft 160 has an outside diameter larger than the bore diameter of a rotary shaft insert hole 159 and is inserted into the rotary shaft insert hole 159.

A magnet insert hole 515a1 is provided in the main magnetic pole [a] and bow-shaped in cross section (taken in a direction perpendicular to the axial direction). The bow-like shape is formed to bulge in the radially inward direction (or to be recessed in the radially outward direction).

A permanent magnet 152a having a bow-shaped cross section is inserted into the magnet insert hole 151a1, typically by a clearance fit, such that a gap is formed between the permanent magnet 152a and the magnet insert hole 151a1.

Bridges 153a1, 153a2 are provided between outer end walls 151a2, 151a3 of the magnet insert hole 151a1 and the outer circumferential surface (150DA, 150AB in FIG. 5) of the rotor 150.

An interlock 157a elongated in the circumferential direction of the rotor 150 is disposed radially outward of the magnet insert hole 151a1 in the main magnetic pole [a].

Further, a semi-tubular rivet insert hole 155a is formed radially outward of the interlock 157a in the main magnetic pole [a]. A semi-tubular rivet 156a is inserted into the semi-tubular rivet insert hole 155a. In this embodiment, the semi-tubular rivet 156a is inserted into the semi-tubular rivet insert hole 155a, typically by a clearance fit, such that a gap is formed between the semi-tubular rivet 156a and the semi-tubular rivet insert hole 155a. In the construction in which the semi-tubular rivet insert hole 155a is disposed in a radially outward region of the rotor 150, the semi-tubular rivet 156a inserted into the semi-tubular rivet insert hole 155a is also disposed in a radially outward region of the rotor 150. As a result, rotation of the rotor 150 is well balanced, so that the weight of the balance weight 54a (see FIG. 2), accordingly the height of the balance weight 54a can be lowered. Therefore, axial length of the rotor 150 can be shortened and thus the size of the rotor 150 can be reduced.

The interlock 157a and the semi-tubular rivet insert hole 155a are disposed on the center line (d-axis) of the main magnetic pole [a].

Further, passage holes 158a1, 158a2 are disposed radially outward of the interlock 157a in the main magnetic pole [a] and arranged on the both sides (symmetrically) in the circumferential direction with respect to the center line (d-axis) of the main magnetic pole [a].

In the auxiliary magnetic poles [ab], [da], passage holes 158ab, 158da are disposed in a radially inward region of the rotor 150. Further, interlocks 157ab, 157da elongated in the radial direction of the rotor 150 are disposed radially outward of the passage holes 158ab, 158da in the auxiliary magnetic poles [ab], [da]. The passage holes 158ab, 158da and the interlocks 157ab, 157da are disposed on the center line (q-axis) of the auxiliary magnetic poles [ab], [da].

Like the outer circumferential surface of the rotor 50 of the first embodiment, the outer circumferential surface of the rotor 150 comprises outer circumferential surface portions 150A to 150D (first outer circumferential surface portions which intersect with the d-axis) assigned to the main magnetic poles [a] to [d], and outer circumferential surface portions 150AB to 150DA (second outer circumferential surface portions which intersect with the q-axis) assigned to the auxiliary magnetic poles [ab] to [da].

The first outer circumferential surface portion 150A assigned to the main magnetic pole [a] has a circular arc shape having its center of curvature on a point O (center of the rotor 150) on the center line (d-axis) of the main magnetic pole [a] and having a radius Rd. Further, each of the second outer circumferential surface portions 150AB, 150DA assigned to the auxiliary magnetic poles [ab], [da] has a circular arc shape having its center of curvature on a point P on the center line (q-axis) of the assigned auxiliary magnetic pole [ab] or [da] and having a radius Rq. The point P is located in a position displaced from the point O (center of the rotor 150) away from the assigned outer circumferential surface portion 150AB or 150DA.

The radius Rq is larger than the radius Rd. In other words, the maximum width of the gap g between the second outer circumferential surface portions 150AB, 150DA and the inside surface of the stator 40 is larger than the maximum width of the gap g between the first outer circumferential surface portion 150A and the inside surface of the stator 40.

The curve profile and the center of curvature of each of the first outer circumferential surface portion 150A and the second outer circumferential surface portions 150AB, 150DA can be appropriately selected.

In this embodiment, stress which is produced when the rotary shaft 160 is inserted into the rotary shaft insert hole 159 and which acts to expand the outside diameter of the main magnetic pole [a], is absorbed by the gap between the magnet insert hole 151a1 and the permanent magnet 152a, the gap between the semi-tubular rivet 156a and the semi-tubular rivet insert hole 155a, and the bore space of the passage holes 158a1, 158a2. Therefore, the amount of expansion of the outside diameter of the main magnetic pole [a] by the stress can be reduced.

Further, stress which is produced when the rotary shaft 160 is inserted into the rotary shaft insert hole 159 and which acts to expand the outside diameter of the auxiliary magnetic poles [ab], [da], is absorbed by the bore space of the passage holes 158ab, 158da and the interlocks 157ab, 157da elongated in the radial direction of the rotor 150. Therefore, the amount of expansion of the outside diameter of the auxiliary magnetic poles [ab], [da] by the stress can be reduced.

Further, the outer circumferential surface of the rotor 50 comprises the first outer circumferential surface portion 150A which intersects with the d-axis and the second outer circumferential surface portions 150AB, 150DA which intersect with the q-axis. Further, the maximum width of the gap g between the second outer circumferential surface portions 150AB, 150DA and the inside surface of the stator 40 is larger than the maximum width of the gap g between the first outer circumferential surface portion 150A and the inside surface of the stator 40. With this construction, even if the outer diameter of the auxiliary magnetic poles [ab], [da] of the rotor 150 is expanded by the stress produced during insertion of the rotary shaft 160 into the rotary shaft insert hole 159, the gap between the outside surface of the rotor 150 and the inside surface of the stator 40 can be prevented from being narrowed.

With the construction as described above, the motor performance can be improved, and the permanent magnets can be prevented from being cracked or chipped, and generation of noise and vibration can be reduced or prevented.

Further, the radius of curvature of the second outer circumferential surface portions 150AB, 150DA is larger than the radius of curvature of the first outer circumferential surface portion 150A. With this configuration, the contour of the outer circumferential surface of the rotor 150 is prevented from being significantly changed at the boundaries between the outer circumferential surface portion 150A and the outer circumferential surface portions 150AB, 150DA. Therefore, the flow of the magnetic flux through the teeth 42 of the stator 40 can be prevented from being abruptly changed, so that the harmonic components contained in the induced electromotive force of the stator winding 41 can be reduced.

Further, the semi-tubular rivet insert hole 155a and the passage holes 158a1, 158a2 are formed in the main magnetic pole [a] and located radially outward of the magnet insert hole 151a1. With this configuration, the magnetic resistance can be increased in a region of the main magnetic pole [a] which is located radially outward of the magnet insert hole 151a1. Therefore, the magnetic flux flowing through the radially outward region of the rotor 150, which may cause noise and vibration, can be reduced.

Further, the semi-tubular rivet insert hole 155a is disposed in a radially outward region of the rotor 150. With this configuration, rotation of the rotor 150 is well balanced, so that the height of the balance weight 54a can be lowered. Accordingly, the size of the rotor 150 can be reduced.

Further, the semi-tubular rivet insert hole 155a is formed in a position radially outward of the magnet insert hole 151a1. With this configuration, the axial length of a region of the rotor 150 which is located radially outward of the magnet insert hole 151a1 can be prevented from becoming longer.

Further, the passage holes 158ab, 158da are formed in a position radially inward of the interlocks 157ab, 157da (in a radially inward region of the rotor 150). With this configuration, the centrifugal force that acts upon the medium flowing through the passage holes 158ab, 158da can be reduced, and thus the fluid resistance of the medium can be reduced. Therefore, the medium can easily flow through the passage holes 158ab, 158da.

Third Embodiment

Figure 6:
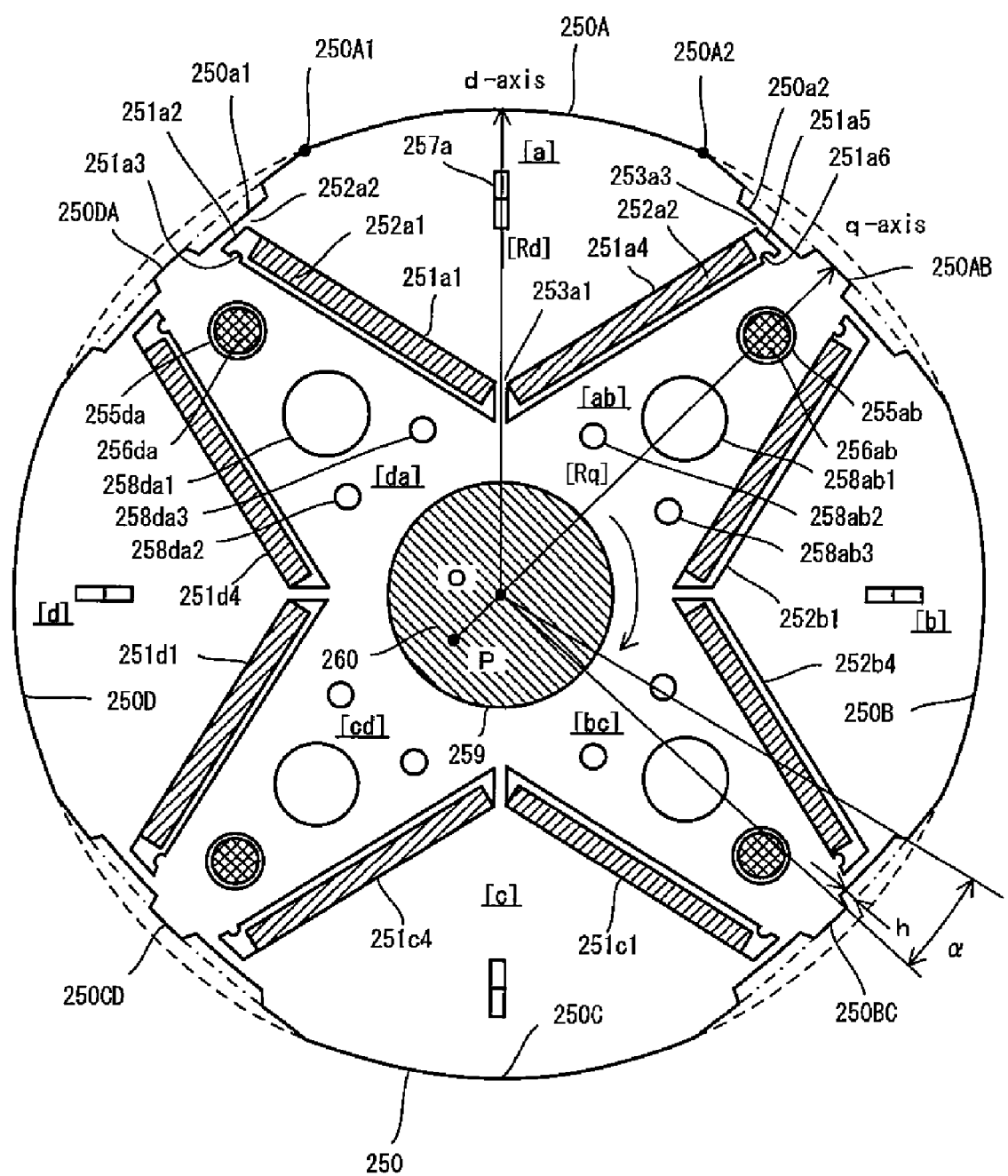
FIG. 6 is a cross section of a rotor of a permanent magnet motor according to a third embodiment.

FIG. 6 is a cross section showing a rotor 250 of a permanent magnet motor according to a third embodiment.

A rotary shaft 260 has an outside diameter larger than the bore diameter of a rotary shaft insert hole 259 and is inserted into the rotary shaft insert hole 259.

Magnet insert holes 251a1, 251a4 are arranged in V-shape in the main magnetic pole [a] of the rotor 250. The V-shape is formed to bulge in the radially inward direction (or to be recessed in the radially outward direction) of the rotor 250. A bridge 253a1 is provided between the magnet insert holes 251a1 and 251a4 (in the central region of the main magnetic pole [a]).

Permanent magnets 252a1, 252a2 having a rectangular cross section (taken in a direction perpendicular to the axial direction) are inserted into the magnet insert holes 251a1, 251a4. Projections 251a3, 251a6 are formed on the magnet insert hole 251a1 and serve to position the permanent magnets 252a1, 252a2. Thus, spaces (non-magnetic regions) are provided between outer end walls 251a2, 251a5 of the magnet insert holes 251a1, 251a4 and the end of the permanent magnets 252a1, 252a2. The spaces prevent a short circuit of the magnetic flux generated at the permanent magnets 252a1, 252a2.

The permanent magnets 252a1, 252a2 are inserted into the magnet insert holes 251a1, 251a4. In this embodiment, the permanent magnets 252a1, 252a are inserted into the magnet insert holes 251a1, 251a4, typically by a clearance fit, such that a gap is formed between the permanent magnets 252a1, 252a and the magnet insert holes 251a1, 251a4.

In the main magnetic pole [a], an interlock 257a elongated in the radial direction of the rotor 250 is disposed radially outward of the magnet insert holes 251a1, 251a4. The interlock 257a is disposed on the center line (d-axis) of the main magnetic pole [a].

In the auxiliary magnetic poles [ab], [da], semi-tubular rivet insert holes 255ab, 255da are formed in a radially outward region of the rotor 250. Semi-tubular rivets 256ab, 256da are inserted into the semi-tubular rivet insert holes 255ab, 255da. In this embodiment, the semi-tubular rivets 256ab, 256da are inserted into the semi-tubular rivet insert holes 255ab, 255da, typically by a clearance fit, such that a gap is formed between the semi-tubular rivets 256ab, 256da and the assigned semi-tubular rivet insert holes 255ab, 255da.

In the construction in which the semi-tubular rivet insert holes 255ab, 255da are disposed in a radially outward region of the rotor 250, the semi-tubular rivets 256ab, 256da inserted into the semi-tubular rivet insert holes 255ab, 255da are also disposed in a radially outward region of the rotor 250. As a result, rotation of the rotor 250 is well balanced, so that the height of the balance weight 54a (see FIG. 2) can be lowered. Accordingly, the axial length of the rotor 250 can be shortened and thus the size of the rotor 250 can be reduced.

Further, in the auxiliary magnetic poles [ab], [da], passage holes 258ab1, 258ab2, 258ab3, 258da1, 258da2, 258da3 are disposed radially inward of the semi-tubular rivet insert holes 255ab, 255da.

The semi-tubular rivet insert holes 255ab, 255da and the passage holes 258ab1, 258da1 having a larger bore diameter are disposed on the center line (q-axis) of the auxiliary magnetic poles [ab], [da]. The passage holes 258ab2, 258ab3, 258da2, 258da3 having a smaller bore diameter are disposed on the both sides (symmetrically) in the circumferential direction with respect to the center line (q-axis) of the auxiliary magnetic poles [ab], [da].

The semi-tubular rivet insert holes 255ab, 255da are disposed in a radially outward region of the rotor 250, and the passage holes 258ab1 to 258ab3, 258da1 to 258da3 are disposed in a radially inward region of the rotor 250.

Like the outer circumferential surface of the rotor 50 of the first embodiment, the outer circumferential surface of the rotor 250 comprises outer circumferential surface portions 250A to 250D (first outer circumferential surface portions) assigned to the main magnetic poles [a] to [d], and outer circumferential surface portions 250AB to 250DA (second outer circumferential surface portions) assigned to the auxiliary magnetic poles [ab] to [da].

The first outer circumferential surface portion 250A assigned to the main magnetic pole [a] has a circular arc shape having its center of curvature on a point O (center of the rotor 250) on the center line (d-axis) of the main magnetic pole [a] and having a radius Rd. Further, each of the second outer circumferential surface portions 250AB, 250DA assigned to the auxiliary magnetic poles [ab], [da] has a circular arc shape having its center of curvature on a point P on the center line (q-axis) of the assigned auxiliary magnetic pole [ab] or [da] and having a radius Rq. The point P is located in a position displaced from the point O (center of the rotor 250) away from the assigned outer circumferential surface portion 250AB or 250DA. The radius Rq is larger than the radius Rd. In other words, the maximum width of the gap g between the second outer circumferential surface portions 250AB, 250DA and the inside surface of the stator 40 is larger than the maximum width of the gap g between the first outer circumferential surface portion 250A and the inside surface of the stator 40.

The curve profile and the center of curvature of each of the first outer circumferential surface portion 250A and the second outer circumferential surface portions 250AB, 250DA can be appropriately selected.

When the magnetic flux generated at the permanent magnets 252a1, 252a2 in the magnet insert holes 251a1, 251a4 is short-circuited via the teeth 42 of the stator 40, the magnetic flux flowing through the teeth 42 changes. As a result, cogging torque is produced, which causes noise and vibration.

In this embodiment, recesses 250a1, 250a2 are formed in the second outer circumferential surface portions 250AB, 250DA assigned to the auxiliary magnetic poles [ab], [da] and located to face outer end walls 251a2, 251a5 of the magnet insert holes 251a1, 251a4. The minimums of the width α (represented by the angle or circumferential extent) and the depth h of the recesses 250a1, 250a2 are set such that the magnetic flux generated at the permanent magnets 252a1, 252a2 can be prevented from being short-circuited via the teeth 42. In such setting, the motor efficiency is also considered. Further, the width α of the recesses 250a1, 250a2 is larger than the width (represented by the angle or circumferential extent) of the outer end walls 251a2, 251a5 of the magnet insert holes 251a1, 251a4.

The depth h of the recesses 250a1, 250a2 is a distance between the bottom of the recesses 250a1, 250a2 and a virtual outer circumferential surface (shown by a chain line in FIG. 6) defined by extending the second outer circumferential surface portions 250AB, 250DA of the auxiliary magnetic poles [ab], [da] in the circumferential direction.

In this embodiment, stress which is produced when the rotary shaft 260 is inserted into the rotary shaft insert hole 259 and which acts to expand the outside diameter of the main magnetic pole [a], is absorbed by the gap between the magnet insert holes 251a1, 251a4 and the permanent magnets 252a1, 252a2 and the radially elongated interlock 257a. Therefore, the amount of expansion of the outside diameter of the main magnetic pole [a] by the stress can be reduced.

Further, stress which is produced when the rotary shaft 260 is inserted into the rotary shaft insert hole 259 and which acts to expand the outside diameter of the auxiliary magnetic pole [ab], is absorbed by the bore space of the passage holes 258ab1 to 258ab3 and the gap between the semi-tubular rivet insert hole 255ab and the semi-tubular rivet 256ab. Stress which acts to expand the outside diameter of the auxiliary magnetic pole [da] is absorbed by the bore space of the passage holes 258da1 to 258da3 and the gap between the semi-tubular rivet insert hole 255da and the semi-tubular rivet 256da. Therefore, the amount of expansion of the outside diameter of the auxiliary magnetic poles [ab], [da] by the stress can be reduced.

Further, the outer circumferential surface of the rotor 250 comprises an outer circumferential surface portion 250A assigned to the main magnetic pole [a], and outer circumferential surface portions 250AB, 250DA assigned to the auxiliary magnetic poles [ab], [da]. The maximum width of the gap g between the second outer circumferential surface portions 250AB, 250DA and the inside surface of the stator 40 is larger than the maximum width of the gap g between the first outer circumferential surface portion 250A and the inside surface of the stator 40. With this configuration, even if the outer diameter of the auxiliary magnetic poles [ab], [da] is expanded by the stress produced during insertion of the rotary shaft 260 into the rotary shaft insert hole 259, the gap between the outside surface of the rotor 250 and the inside surface of the stator 40 can be prevented from being narrowed.

With the construction as described above, the motor performance can be improved, and the permanent magnets can be prevented from being cracked or chipped, and generation of noise and vibration can be reduced or prevented.

Further, the radius of curvature of the second outer circumferential surface portions 250AB, 250DA is larger than the radius of curvature of the first outer circumferential surface portion 250A. With this configuration, the contour of the outer circumferential surface of the rotor 250 is prevented from being significantly changed at the boundaries between the first outer circumferential surface portion 250A and the second outer circumferential surface portions 250AB, 250DA. Therefore, the flow of the magnetic flux through the teeth 42 of the stator 40 can be prevented from being abruptly changed, so that the harmonic components contained in the induced electromotive force of the stator winding 41 can be reduced.

Further, the interlock 257a is disposed radially outward of the magnet insert holes 251a1 and 251a4 in the main magnetic pole [a]. With this configuration, the magnetic resistance can be increased in a region of the main magnetic pole [a] which is located radially outward of the magnet insert holes 251a1, 251a4. Therefore, the magnetic flux flowing through the radially outward region of the rotor 250, which may cause noise and vibration, can be reduced.

Further, the semi-tubular rivet insert holes 255ab, 255da are formed in the auxiliary magnetic poles [ab], [da]. Therefore, in the auxiliary magnetic poles [ab], [da] in which the inside surface and the outside surface of the rotor 250 are directly connected to each other without a magnet insert hole therebetween, the rotor 250 is integrated by the semi-tubular rivets 256ab, 256da. Thus, the strength of the rotor 250 can be increased.

Further, the semi-tubular rivet insert holes 255ab, 255da are disposed in a radially outward region of the rotor 250. With this configuration, rotation of the rotor 250 is well balanced, so that the height of the balance weight 54a can be lowered and thus the size of the balance weight 54a can be reduced. Accordingly, the axial length and thus the entire size of the rotor 250 can be reduced.

Further, the passage holes 258ab1 to 258ab3, 258da1 to 258da3 are formed in a position radially inward of the semi-tubular rivet insert holes 255ab, 255da (in a radially inward region of the rotor). With this configuration, the centrifugal force that acts upon the medium flowing through the passage holes 258ab1 to 258ab3, 258da1 to 258da3 can be reduced, and thus the fluid resistance of the medium can be reduced. Therefore, the medium can easily flow through the passage holes 258ab1 to 258ab3, 258da1 to 258da3.

Further, the recesses 250a1, 250a2 are formed in the second outer circumferential surface portions 250AB, 250DA assigned to the auxiliary magnetic poles [ab], [da] and located to face the outer end walls 251a2, 251a5 of the magnet insert holes 251a1, 251a4. With this configuration, the magnetic flux generated at the permanent magnets can be prevented from being short-circuited via the teeth 42 of the stator 40, and thus the cogging torque can be reduced. Therefore, noise and vibration caused due to the cogging torque can be reduced.

Fourth Embodiment

Figure 7:
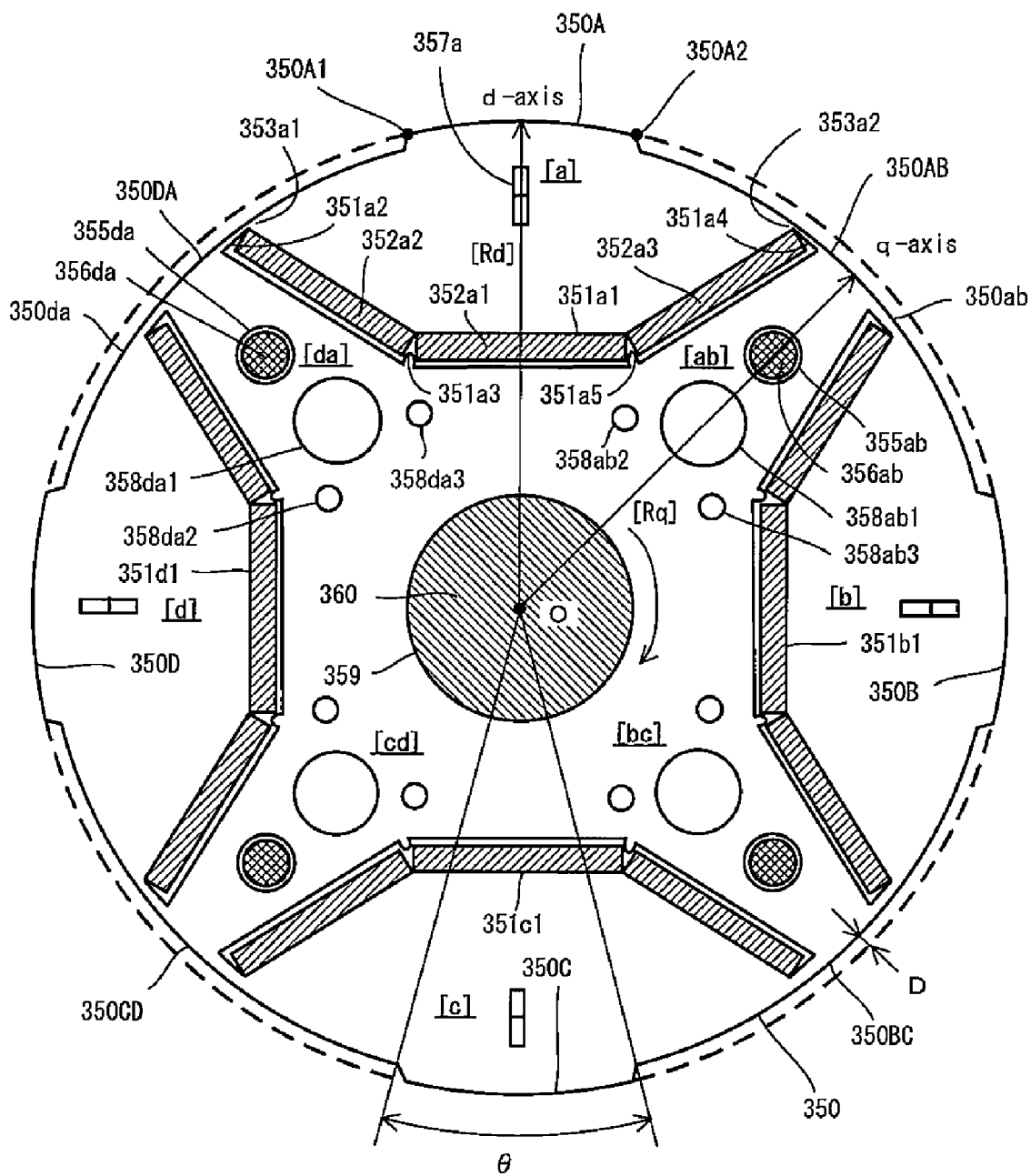
FIG. 7 is a cross section of a rotor of a permanent magnet motor according to a fourth embodiment.

FIG. 7 is a cross section showing a rotor 350 of a permanent magnet motor according to a fourth embodiment.

A rotary shaft 360 has an outside diameter larger than the bore diameter of a rotary shaft insert hole 359 and is inserted into the rotary shaft insert hole 359.

Trapezoidal magnet insert hole 351a1 is disposed in the main magnetic pole [a] of the rotor 350. The trapezoidal shape is formed to bulge in the radially inward direction (or to be recessed in the radially outward direction) of the rotor 350. Three permanent magnets 352a1 to 352a3 having a rectangular cross section (taken in a direction perpendicular to the axial direction) are inserted into the magnet insert hole 351a1. Projections 351a3, 351a5 are formed on the magnet insert hole 351a1 and serve to position the permanent magnets 352a1 to 352a3. The permanent magnets 352a1 to 352a3 are inserted into the magnet insert hole 351a1, typically by a clearance fit, such that a gap is formed between the permanent magnets 352a1 to 352a3 and the magnet insert hole 351a1.

An interlock, semi-tubular rivet insert holes and passage holes are arranged in the main magnetic pole [a] and the auxiliary magnetic poles [ab], [da] of the rotor 350 in the same manner as in the third embodiment.

In the main magnetic pole [a], an interlock 357a elongated in the radial direction of the rotor 350 is disposed radially outward of the magnet insert hole 351a1.

In the auxiliary magnetic poles [ab], [da], semi-tubular rivet insert holes 355ab, 355da are formed in a radially outward region of the rotor 350. Further, in the auxiliary magnetic poles [ab], [da], passage holes 358ab1, 358ab2, 358ab3, 358da1, 358da2, 358da3 are disposed radially inward of the semi-tubular rivet insert holes 355ab, 355da. Semi-tubular rivets 356ab, 356da are inserted into the semi-tubular rivet insert holes 355ab, 355da, typically by a clearance fit, such that a gap is formed between the semi-tubular rivets 356ab, 356da and the assigned semi-tubular rivet insert holes 355ab, 355da.

In the construction in which the semi-tubular rivet insert holes 355ab, 355da are disposed in a radially outward region of the rotor 350, the semi-tubular rivets 356ab, 356da inserted into the semi-tubular rivet insert holes 355ab, 355da are also disposed in a radially outward region of the rotor 350. As a result, rotation of the rotor 350 is well balanced, so that the height of the balance weight 54a (see FIG. 2) can be lowered. Accordingly, the axial length of the rotor 350 can be shortened and thus the size of the rotor 350 can be reduced.

The outer circumferential surface of the rotor 350 comprises outer circumferential surface portions 350A to 350D (first outer circumferential surface portions) assigned to the main magnetic poles [a] to [d], and outer circumferential surface portions 350AB to 350DA (second outer circumferential surface portions) assigned to the auxiliary magnetic poles [ab] to [da].

The maximum distance between the center O of the rotor 350 and the second outer circumferential surface portions 350AB, 350DA assigned to the auxiliary magnetic poles [ab], [da] is shorter than the maximum distance between the center O of the rotor 350 and the first outer circumferential surface portion 350A assigned to the main magnetic poles [a]. In other words, the maximum width of the gap g between the second outer circumferential surface portions 350AB, 350DA and the inside surface of the stator 40 is larger than the maximum width of the gap g between the first outer circumferential surface portion 350A and the inside surface of the stator 40.

In this embodiment, the first outer circumferential surface portion 350A assigned to the main magnetic pole [a] has a circular arc shape having its center of curvature on a point O (the center of the rotor 350) on the center line (d-axis) of the main magnetic pole [a] and having a radius Rd. Further, each of the second outer circumferential surface portions 350AB, 350DA assigned to the auxiliary magnetic poles [ab], [da] has a circular arc shape having its center of curvature on the point O (the center of the rotor 350) on the center line (q-axis) of the assigned auxiliary magnetic pole [ab] or [da] and having a radius Rq. The radius Rq is smaller than the radius Rd. In other words, the second outer circumferential surface portions 350AB, 350DA coincide with the bottom of recesses 350ab, 350da which are formed by cutting off virtual outer circumferential surfaces (shown by dashed lines in FIG. 7) defined by extending the first outer circumferential surface portion 350A in the circumferential direction.

The circumferential width (represented by the angle θ or circumferential extent) of the first outer circumferential surface portion 350A or the circumferential width (represented by the angle or circumferential extent) of the second outer circumferential surface portions 350AB, 350DA is set such that the magnetic flux generated at the permanent magnets can be prevented from being short-circuited via the teeth 42 of the stator 40. The first outer circumferential surface portions 350A, 350B and the second outer circumferential surface portion 350AB are formed such that the second outer circumferential surface portion 350AB is located to face the outer end walls of the magnet insert holes which are adjacent in the circumferential direction.

In this embodiment, stress which is produced when the rotary shaft 360 is inserted into the rotary shaft insert hole 359 and which acts to expand the outside diameter of the main magnetic pole [a], is absorbed by the gap between the magnet insert hole 351a1 and the permanent magnets 352a1 to 352a3 and the interlock 357a elongated in the radial direction of the rotor 350. Therefore, the amount of expansion of the outside diameter of the main magnetic pole [a] by the stress can be reduced.

Further, stress which is produced when the rotary shaft 360 is inserted into the rotary shaft insert hole 359 and which acts to expand the outside diameter of the auxiliary magnetic poles [ab], [da], is absorbed by the bore space of the passage holes 358ab1 to 358ab3 and 358da1 to 358da3 and the gap between the semi-tubular rivet insert hole 355ab and the semi-tubular rivet 356ab and the gap between the semi-tubular rivet insert hole 355da and the semi-tubular rivet 356da. Therefore, the amount of expansion of the outside diameter of the auxiliary magnetic poles [ab], [da] by the stress can be reduced.

Further, the outer circumferential surface of the rotor 350 comprises a first outer circumferential surface portion 350A assigned to the main magnetic pole [a] and second outer circumferential surface portions 350AB, 350DA assigned to the auxiliary magnetic poles [ab], [da]. The maximum width of the gap g between the second outer circumferential surface portions 350AB, 350DA and the inside surface of the stator 40 is larger than the maximum width of the gap g between the first outer circumferential surface portion 350A and the inside surface of the stator 40. With this configuration, even if the outer diameter of the auxiliary magnetic poles [ab], [da] is expanded by the stress produced during insertion of the rotary shaft 360 into the rotary shaft insert hole 359, the gap between the outside surface of the rotor 350 and the inside surface of the stator 40 can be prevented from being narrowed.

With the construction as described above, the motor performance can be improved, and the permanent magnets can be prevented from being cracked or chipped, and generation of noise and vibration can be reduced or prevented.

Further, the interlock 357a is disposed radially outward of the magnet insert hole 351a1 in the main magnetic pole [a]. With this configuration, the magnetic resistance can be increased in a region of the main magnetic pole [a] which is located radially outward of the magnet insert hole 351a1. Therefore, the magnetic flux flowing through the radially outward region of the main magnetic pole [a], which may cause noise and vibration, can be reduced.

Further, the semi-tubular rivet insert holes 355ab, 355da are formed in the auxiliary magnetic poles [ab], [da]. Therefore, in the auxiliary magnetic poles [ab], [da] in which the inside surface and the outside surface of the rotor 350 are directly connected to each other without a magnet insert hole therebetween, the rotor 350 is integrated by the semi-tubular rivets 356ab, 356da. Thus, the strength of the rotor 350 can be increased.

Further, the semi-tubular rivet insert holes 355ab, 355da are disposed in a radially outward region of the rotor 350. With this configuration, rotation of the rotor 350 is well balanced, so that the height of the balance weight 54a can be lowered. Accordingly, the size of the rotor 350 can be reduced.

Further, the passage holes 358ab1 to 358ab3, 358da1 to 358da3 are formed in a position radially inward of the semi-tubular rivet insert holes 355ab, 355da (in a radially inward region of the rotor 350). With this configuration, the centrifugal force that acts upon the medium flowing through the passage holes 358ab1 to 358ab3, 358da1 to 358da3 can be reduced, and thus the fluid resistance of the medium can be reduced. Therefore, the medium can easily flow through the passage holes 358ab1 to 358ab3, 358da1 to 358da3.

Further, the recesses 350da, 350ab are formed in the second outer circumferential surface portions of the rotor and in a position to face the outer end walls 351a2, 351a4 of the magnet insert hole 351a1. With this configuration, the magnetic flux generated at the permanent magnets can be prevented from being short-circuited via the teeth 42 of the stator 40, and thus the cogging torque can be reduced. Therefore, noise and vibration caused due to the cogging torque can be reduced.

In the above description, the technique of the present invention is described as being applied to rotors in which the shape of outer circumferential surface portions assigned to main magnetic poles (first outer circumferential surface portions) is different from the shape of outer circumferential surface portions assigned to auxiliary magnetic poles (second outer circumferential surface portions). However, the technique of the present invention can also be applied to a rotor in which the shape of outer circumferential surface portions assigned to main magnetic poles is the same as the shape of outer circumferential surface portions assigned to auxiliary magnetic poles.

Fifth Embodiment

Figure 8:
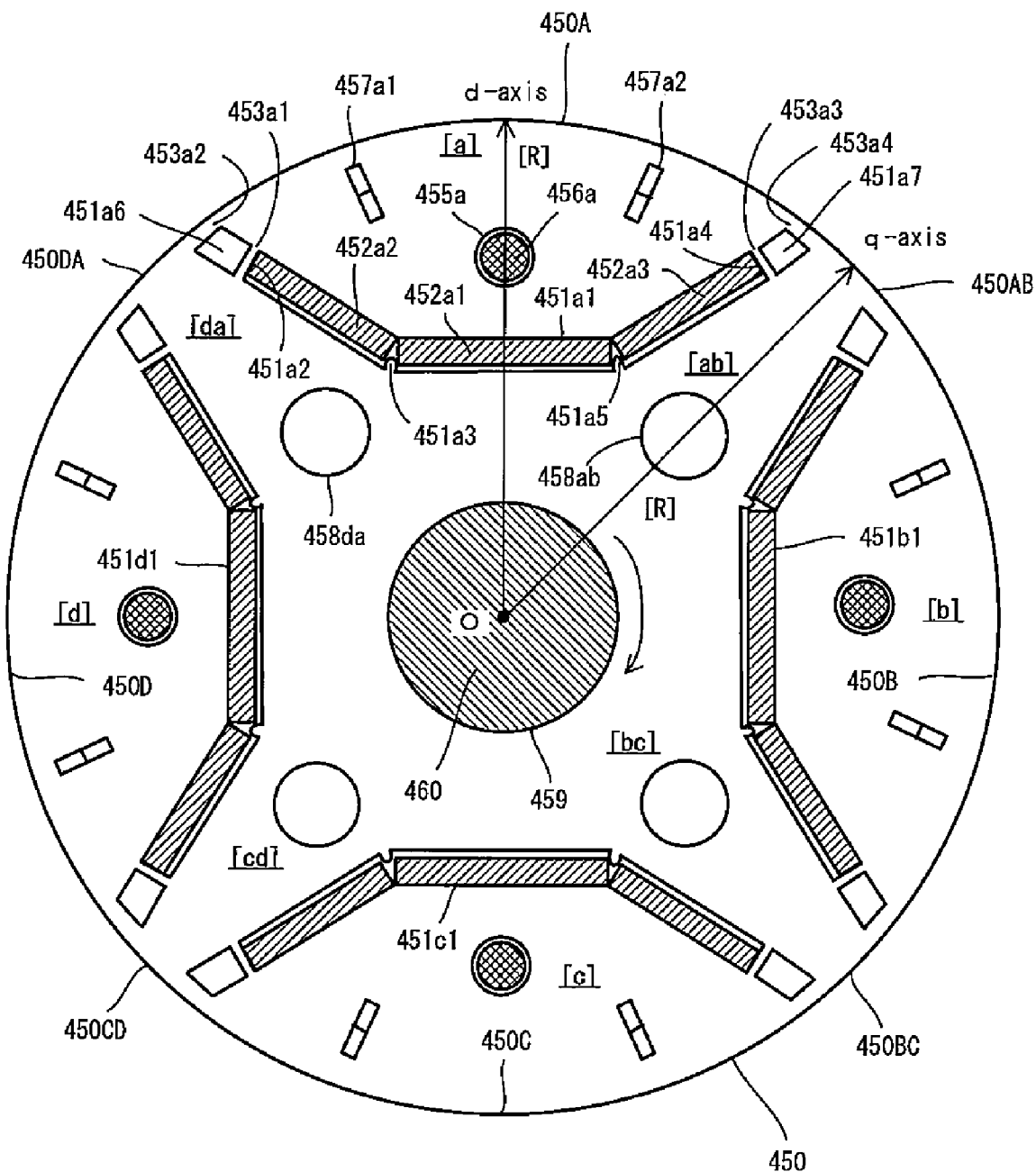
FIG. 8 is a cross section of a rotor of a permanent magnet motor according to a fifth embodiment.

FIG. 8 is a cross section showing a rotor 450 of a permanent magnet motor according to a fifth embodiment.

The outer circumferential surface of the rotor 450 comprises outer circumferential surface portions 450A to 450D assigned to the main magnetic poles [a] to [d], and outer circumferential surface portions 450AB to 450DA assigned to the auxiliary magnetic poles [ab] to [da]. Each of the outer circumferential surface portions 450A to 450D, 450AB to 450DA has a circular arc shape having its center of curvature on the center O of the rotor 450 and having a radius R. Specifically, the outer circumferential surface of the rotor 450 is circular in cross section (taken in a direction perpendicular to the axial direction).

A trapezoidal magnet insert hole 451a1 is formed in the main magnetic pole [a]. The trapezoidal shape is formed to bulge in the radially inward direction (or to be recessed in the radially outward direction). Three permanent magnets 452a1 to 452a3 each having a rectangular cross section (taken in a direction perpendicular to the axial direction) are inserted into the magnet insert hole 451a1. Projections 451a3 and 451a5 are formed on the magnet insert hole 451a1 and serve to position the permanent magnets 452a1 to 452a3 within the magnet insert hole 451a1. The permanent magnets 452a1 to 452a3 are inserted into the magnet insert hole 451a1, typically by a clearance fit, such that a gap is formed between the permanent magnets 452a1 to 452a3 and the magnet insert hole 451a1.

Spaces (non-magnetic regions) 451a6, 451a7 are provided between outer end walls 451a2, 451a4 of the magnet insert hole 451a1 and the outer circumferential surface of the rotor 450. Bridges 453a1, 453a3 are provided between the outer end walls 451a2, 451a4 of the magnet insert hole 451a1 and the spaces 451a6, 451a7. Further, bridges 453a2, 453a4 are provided between the spaces 451a6, 451a7 and the outer circumferential surface of the rotor 450.

A semi-tubular rivet insert hole 455a is formed in the main magnetic pole [a] and located radially outward of the magnet insert hole 451a1. The semi-tubular rivet insert hole 455a is formed on the center line (d-axis) of the main magnetic pole [a]. A semi-tubular rivet 456a is inserted into the semi-tubular rivet insert hole 455a, typically by a clearance fit, such that a gap is formed between the semi-tubular rivet 456a and the semi-tubular rivet insert hole 455a.

Further, in the main magnetic pole [a], interlocks 457a1, 457a2 elongated in the radial direction of the rotor are disposed radially outward of the semi-tubular rivet insert hole 455a and arranged on the both sides (symmetrically) in the circumferential direction with respect to the center line (d-axis) of the main magnetic pole [a].

In the auxiliary magnetic poles [ab], [da], passage holes 458ab, 458da are disposed in a radially inward region of the rotor 450. The passage holes 458ab, 458da are located on the center line (q-axis) of the auxiliary magnetic poles [ab], [da].

In this embodiment, stress which is produced when the rotary shaft 460 is inserted into the rotary shaft insert hole 459 and which acts to expand the outside diameter of the main magnetic pole [a], is absorbed by the gap between the magnet insert hole 451a1 and the permanent magnets 452a1 to 452a3, the gap between the semi-tubular rivet 456a and the semi-tubular rivet insert hole 455a, and the radially elongated interlocks 457a1, 457a2. Therefore, the amount of expansion of the outside diameter of the main magnetic pole [a] can be reduced.

Further, stress which is produced when the rotary shaft 460 is inserted into the rotary shaft insert hole 459 and which acts to expand the outside diameter of the auxiliary magnetic poles [ab], [da], is absorbed by the bore space of the passage holes 458ab, 458da. Therefore, the amount of expansion of the outside diameter of the auxiliary magnetic poles [ab], [da] by the stress can be reduced.

With the construction as described above, the motor performance can be improved, and the permanent magnets can be prevented from being cracked or chipped, and generation of noise and vibration can be reduced or prevented.

Further, the semi-tubular rivet insert hole 455a and the interlocks 457a1, 457a2 are formed in the main magnetic pole [a] and located radially outward of the magnet insert hole 451a1. With this configuration, the magnetic resistance can be increased in a region of the main magnetic pole [a] which is located radially outward of the magnet insert hole 451a1. Therefore, the magnetic flux flowing through the radially outward region of the main magnetic pole [a] of the rotor 450, which may cause noise and vibration, can be reduced.

Further, the semi-tubular rivet insert hole 455a is formed in a position radially outward of the magnet insert hole 451a1. With this configuration, the axial length of a region of the rotor 450 which is located radially outward of the magnet insert hole 451a1 can be prevented from becoming longer.

Further, the interlocks 457a1, 457a2 are disposed radially outward of the semi-tubular rivet insert hole 455a. With this configuration, magnetic flux by higher harmonics which flows through the radially outward region of the rotor 450 can be reduced, and thus the iron loss of the rotor 450 can be reduced.

Further, the passage holes 458ab, 458da are formed in a radially inward region of the rotor 450. With this configuration, the centrifugal force that acts upon the medium flowing through the passage holes 458ab, 458da can be reduced, and thus the fluid resistance of the medium can be reduced. Therefore, the medium can easily flow through the passage holes 458ab, 458da.

Sixth Embodiment

Figure 9:
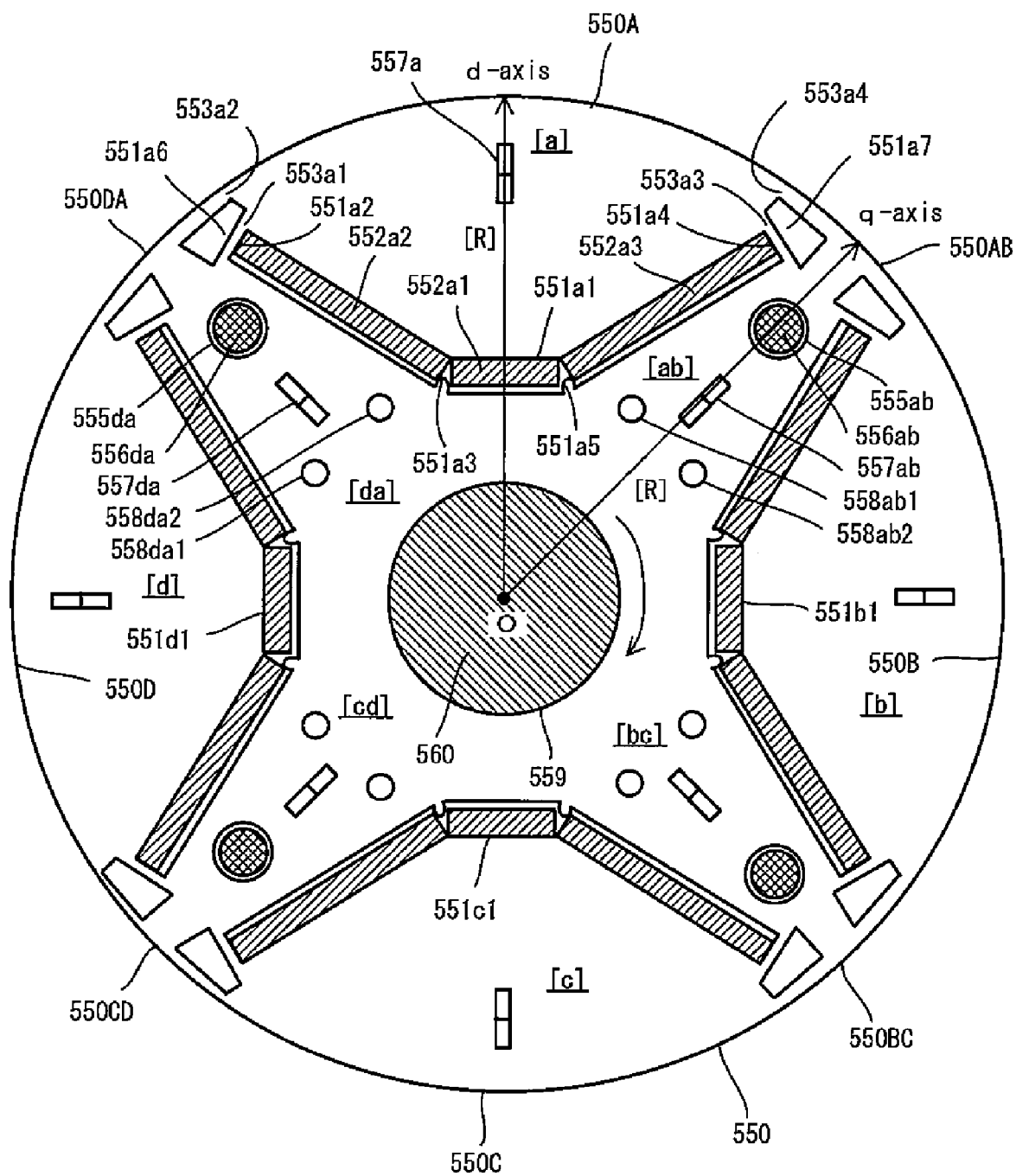
FIG. 9 is a cross section of a rotor of a permanent magnet motor according to a sixth embodiment.

FIG. 9 is a cross section showing a rotor 550 of a permanent magnet motor according to a sixth embodiment.

The outer circumferential surface of the rotor 550 comprises outer circumferential surface portions 550A to 550D assigned to the main magnetic poles [a] to [d], and outer circumferential surface portions 550AB to 550DA assigned to the auxiliary magnetic poles [ab] to [da]. Each of the outer circumferential surface portions 550A to 550D, 550AB to 550DA has a circular arc shape having its center of curvature on the center O of the rotor 550 and having a radius R.

A trapezoidal magnet insert hole 551a1 is formed in the main magnetic pole [a]. Three permanent magnets 552a1 to 552a3 each having a rectangular cross section (taken in a direction perpendicular to the axial direction) are inserted into the magnet insert hole 551a1. Projections 551a3 and 551a5 are formed on the magnet insert hole 551a1 and serve to position the permanent magnets 552a1 to 552a3 within the magnet insert hole 551a1. The permanent magnets 552a1 to 552a3 are inserted into the magnet insert hole 551a1, typically by a clearance fit, such that a gap is formed between the permanent magnets 552a1 to 552a3 and the magnet insert hole 551a1.

Spaces (non-magnetic regions) 551a6, 551a7 are provided between outer end walls 551a2, 551a4 of the magnet insert hole 551a1 and the outer circumferential surface of the rotor 550. Bridges 553a1, 553a3 are provided between the outer end walls 551a2, 551a4 of the magnet insert hole 551a1 and the spaces 551a6, 551a7. Further, bridges 553a2, 553a4 are provided between the spaces 551a6, 551a7 and the outer circumferential surface of the rotor 550.

In the main magnetic pole [a], an interlock 557a elongated in the radial direction of the rotor is disposed radially outward of the magnet insert hole 551a1. The interlock 257a is disposed on the center line (d-axis) of the main magnetic pole [a].

In the auxiliary magnetic poles [ab], [da], semi-tubular rivet insert holes 555ab, 555da are formed in a radially outward region of the rotor 550. Semi-tubular rivets 556ab, 556da are inserted into the semi-tubular rivet insert holes 555ab, 555da, typically by a clearance fit, such that a gap is formed between the semi-tubular rivets 556ab, 556da and the assigned semi-tubular rivet insert holes 555ab, 555da.

Further, in the auxiliary magnetic poles [ab], [da], interlocks 557ab, 557da elongated in the radial direction of the rotor are disposed radially inward of the semi-tubular rivets insert holes 555ab, 555da. Further, in the auxiliary magnetic poles [ab], [da], passage holes 558ab1, 558ab2, 558da1, 558da2 are disposed radially inward of the interlocks 557ab, 557da. The semi-tubular rivet insert holes 555ab, 555da and the interlocks 557ab, 557da are located on the center line (q-axis) of the auxiliary magnetic poles [ab], [da]. The passage holes 558ab1, 558ab2, 558da1, 558da2 are disposed on the both sides (symmetrically) in the circumferential direction with respect to the center line (q-axis) of the auxiliary magnetic poles [ab], [da].

In the construction in which the semi-tubular rivet insert holes 555ab, 555da are disposed in a radially outward region of the rotor 550, the semi-tubular rivets 556ab, 556da inserted into the semi-tubular rivet insert holes 555ab, 555da are also disposed in a radially outward region of the rotor 550. As a result, rotation of the rotor 550 is well balanced, so that the height of the balance weight 54a (see FIG. 2) can be lowered. Accordingly, the axial length of the rotor 550 can be shortened and thus the size of the rotor 550 can be reduced.

In this embodiment, stress which is produced when the rotary shaft 560 is inserted into the rotary shaft insert hole 559 and which acts to expand the outside diameter of the main magnetic pole [a], is absorbed by the gap between the magnet insert hole 551a1 and the permanent magnets 552a1 to 552a3 and the radially elongated interlock 557a. Therefore, the amount of expansion of the outside diameter of the main magnetic pole [a] by the stress can be reduced.

Further, stress which is produced when the rotary shaft 560 is inserted into the rotary shaft insert hole 559 and which acts to expand the outside diameter of the auxiliary magnetic pole [ab], is absorbed by the bore space of the passage holes 558*ab*1, 558*ab*2, the radially elongated interlock 557*ab* and the gap between the semi-tubular rivet insert hole 555*ab* and the semi-tubular rivet 556*ab*. Further, stress which acts to expand the outside diameter of the auxiliary magnetic pole [da], is absorbed by the bore space of the passage holes 558*da*1, 558*da*2, the radially elongated interlock 557*da* and the gap between the semi-tubular rivet insert hole 555*da* and the semi-tubular rivet 556*da*. Therefore, the amount of expansion of the outside diameter of the auxiliary magnetic poles [ab], [da] by the stress can be reduced.

With the construction as described above, the motor performance can be improved, and the permanent magnets can be prevented from being cracked or chipped, and generation of noise and vibration can be reduced or prevented.

Further, the interlock 557*a* is disposed radially outward of the magnet insert hole 551*a*1 in the main magnetic pole [a]. With this configuration, the magnetic resistance can be increased in a region of the main magnetic pole [a] which is located radially outward of the magnet insert hole 551*a*1. Therefore, the magnetic flux flowing through the radially outward region of the main magnetic pole [a], which may cause noise and vibration, can be reduced.

Further, the interlock 557*a* is disposed in a radially outward region of the rotor 550. With this configuration, magnetic flux by higher harmonics which flows through the radially outward region of the rotor 550 can be reduced, and thus the iron loss of the rotor 550 can be reduced.

Further, the semi-tubular rivet insert holes 555*ab*, 555*da* are formed in the auxiliary magnetic poles [ab], [da]. Therefore, in the auxiliary magnetic poles [ab], [da] in which the inside surface and the outside surface of the rotor 550 are directly connected to each other without a magnet insert hole therebetween, the rotor 550 is integrated by the semi-tubular rivets 556*ab*, 556*da*. Thus, the strength of the rotor 550 can be increased.

Further, the semi-tubular rivet insert holes 555*ab*, 555*da* are disposed in a radially outward region of the rotor 550. With this configuration, rotation of the rotor 550 is well balanced, so that the height of the balance weight 54*a* can be lowered and thus the size of the balance weight 54*a* can be reduced.

Further, the passage holes 558*ab*1, 558*ab*2, 558*da*1, 558*da*2 are formed in a radially inward region of the rotor 550. With this configuration, the centrifugal force that acts upon the medium flowing through the passage holes 558*ab*1, 558*ab*2, 558*da*1, 558*da*2 can be reduced, and thus the fluid resistance of the medium can be reduced. Therefore, the medium can easily flow through the passage holes 558*ab*1, 558*ab*2, 558*da*1, 558*da*2.

Seventh Embodiment

Figure 10:
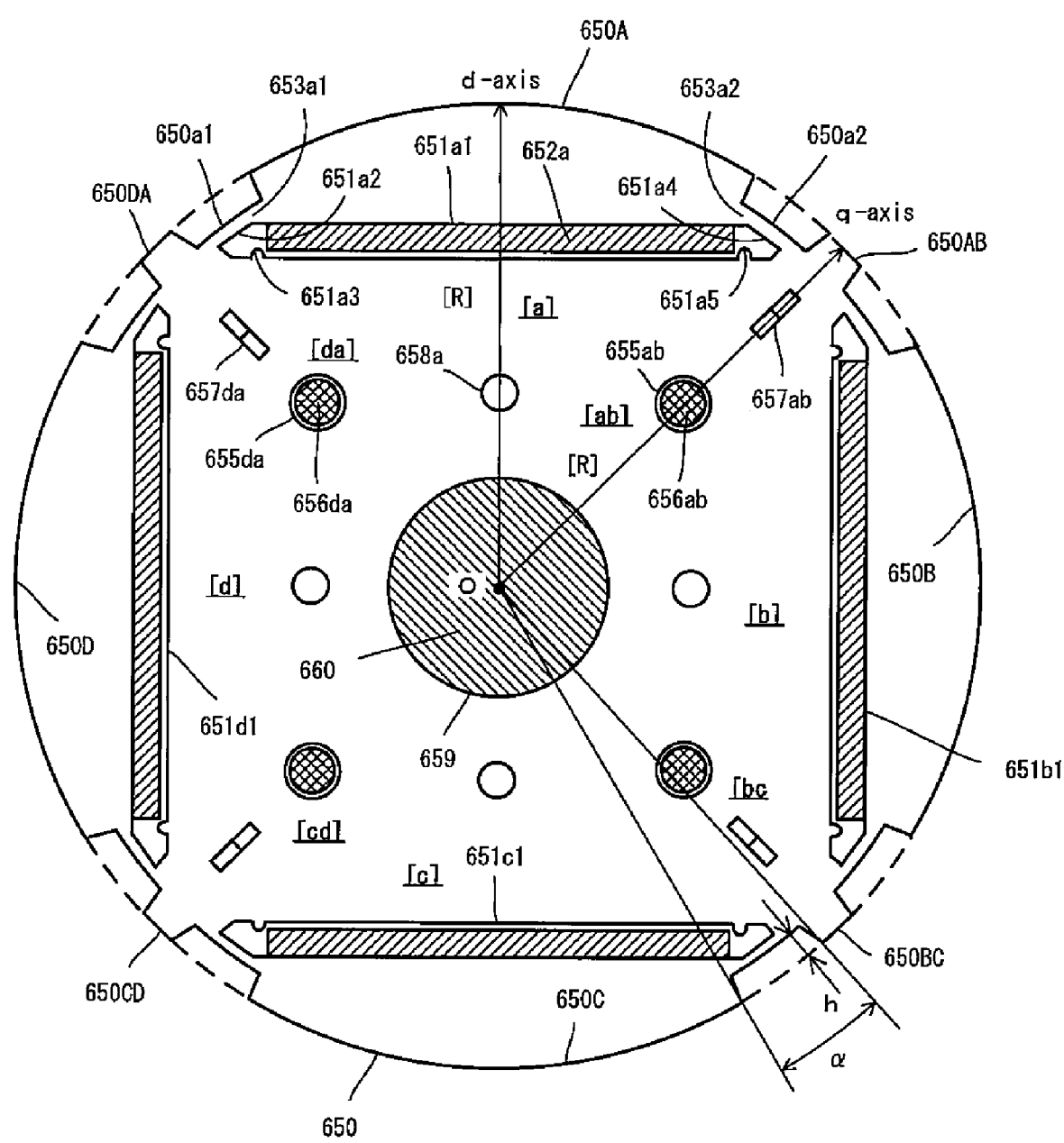
FIG. 10 is a cross section of a rotor of a permanent magnet motor according to a seventh embodiment.
Figure 11:
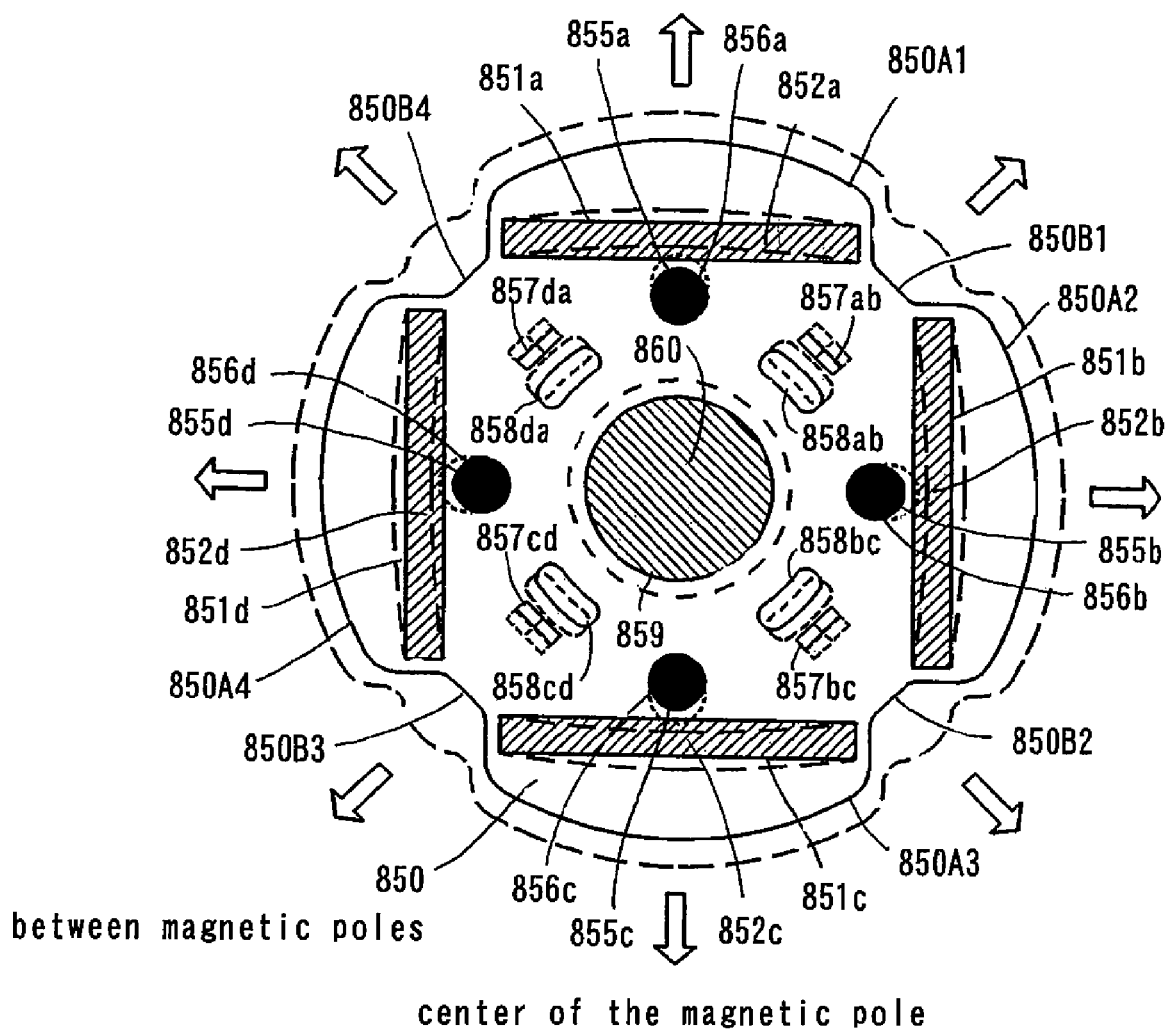
FIG. 11 is a cross section of a prior art rotor.

FIG. 10 is a cross section showing a rotor 650 of a permanent magnet motor according to a seventh embodiment.

The outer circumferential surface of the rotor 650 comprises outer circumferential surface portions 650A to 650D assigned to the main magnetic poles [a] to [d], and outer circumferential surface portions 650AB to 650DA assigned to the auxiliary magnetic poles [ab] to [da]. Each of the outer circumferential surface portions 650A to 650D, 650AB to 650DA has a circular arc shape having its center of curvature on the center O of the rotor 650 and having a radius R.

A magnet insert hole 651*a*1 is formed in the main magnetic pole [a] and has a linear shape in cross section (taken in a direction perpendicular to the axial direction). The linear shape is formed perpendicularly to the radial direction of the rotor 650. A permanent magnet 652*a* having a linear shape in cross section is inserted into the magnet insert hole 651*a*1. Projections 651*a*3 and 651*a*5 are formed on the magnet insert hole 651*a*1 and serve to position the permanent magnet 652*a* within the magnet insert hole 651*a*1. By insertion of the permanent magnet 652*a* into the magnet insert hole 651*a*1, spaces (non-magnetic regions) are defined between outer end walls 651*a*2, 651*a*4 of the magnet insert hole 651*a*1 and the ends of the permanent magnet 652*a*. The permanent magnet 652*a* is inserted into the magnet insert hole 651*a*1, typically by a clearance fit, such that a gap is formed between the permanent magnet 652*a* and the magnet insert hole 651*a*1.

In the main magnetic pole [a], a passage hole 658*a* is disposed radially inward of the magnet insert hole 651*a*1.

In the auxiliary magnetic poles [ab], [da], radially elongated interlocks 657*ab*, 657*da* are disposed in a radially outward region of the rotor 650. Further, in the auxiliary magnetic poles [ab], [da], semi-tubular rivet insert holes 655*ab*, 655*da* are disposed radially inward of the interlocks 657*ab*, 657*da*. The semi-tubular rivet insert holes 655*ab*, 655*da* and the interlocks 657*ab*, 657*da* are disposed on the center line (q-axis) of the auxiliary magnetic poles [ab], [da]. Semi-tubular rivets 656*ab*, 656*da* are inserted into the semi-tubular rivet insert holes 655*ab*, 655*da*, typically by a clearance fit, such that a gap is formed between the semi-tubular rivets 656*ab*, 656*da* and the assigned semi-tubular rivet insert holes 655*ab*, 655*da*.

Further, recesses 650*a*1, 650*a*2 are formed in the outer circumferential surface of the rotor 650 and in a position to face the outer end walls 651*a*2, 651*a*4 of the magnet insert hole 651*a*1. The minimums of the width α (represented by the angle or circumferential extent) and the depth h of the recesses 650*a*1, 650*a*2 are set such that the magnetic flux generated at the permanent magnets 652*a* can be prevented from being short-circuited via the teeth 42 of the stator 40. In such setting, the motor efficiency is also considered. Further, the width α of the recesses 650*a*1, 650*a*2 is larger than the width (represented by the angle or circumferential extent) of the outer end walls 651*a*2, 651*a*4 of the magnet insert hole 651*a*1.

The depth h of the recesses 650*a*1, 650*a*2 is a distance between the bottom of the recesses 650*a*1, 650*a*2 and a virtual outer circumferential surface (shown by a dashed line in FIG. 10) defined by extending the outer circumferential surface portion 650A of the main magnetic pole [a] of the rotor 650 in the circumferential direction.

In this embodiment, stress which is produced when the rotary shaft 660 is inserted into the rotary shaft insert hole 659 and which acts to expand the outside diameter of the main magnetic pole [a], is absorbed by the gap between the magnet insert hole 651*a*1 and the permanent magnet 652*a* and the passage hole 658*a*. Therefore, the amount of expansion of the outside diameter of the main magnetic pole [a] by the stress can be reduced.

Further, stress which is produced when the rotary shaft 660 is inserted into the rotary shaft insert hole 659 and which acts to expand the outside diameter of the auxiliary magnetic pole [ab], is absorbed by the gap between the semi-tubular rivet insert hole 655*ab* and the semi-tubular rivet 256*ab* and the radially elongated interlock 657*ab*. Stress which acts to expand the outside diameter of the auxiliary magnetic pole

[da] is absorbed by the gap between the semi-tubular rivet insert hole 655da and the semi-tubular rivet 656da and the radially elongated interlock 657da. Therefore, the amount of expansion of the outside diameter of the auxiliary magnetic poles [ab], [da] by the stress can be reduced.

With the construction as described above, the motor performance can be improved, and the permanent magnets can be prevented from being cracked or chipped, and generation of noise and vibration can be reduced or prevented.

Further, the interlocks 657ab, 657da are disposed in a radially outward region of the rotor 650. With this configuration, magnetic flux by higher harmonics which flows through the radially outward region of the rotor 650 can be reduced, and thus the iron loss of the rotor 650 can be reduced.

Further, the semi-tubular rivet insert holes 655ab, 655da are formed in the auxiliary magnetic poles [ab], [da]. Therefore, in the auxiliary magnetic poles [ab], [da] in which the inside surface and the outside surface of the rotor 650 are directly connected to each other without a magnet insert hole therebetween, the rotor 650 is integrated by the semi-tubular rivets 656ab, 656da. Thus, the strength of the rotor 650 can be increased.

Further, the passage hole 658a is formed in a radially inward region of the rotor 650. With this configuration, the centrifugal force that acts upon the medium flowing through the passage hole 658a can be reduced, and thus the fluid resistance of the medium can be reduced. Therefore, the medium can easily flow through the passage hole 658a.

Further, the interlocks 657ab, 657da are disposed radially outward of the semi-tubular rivet insert holes 655ab, 655da. With this configuration, the magnetic resistance can be increased in a radially outward region of the rotor 650. Therefore, the magnetic flux flowing through the radially outward region of the rotor, which may cause noise and vibration, can be reduced.

In this invention, in a main magnetic pole of the rotor, a gap is formed at least between a magnet insert hole and a permanent magnet. In addition, one of a semi-tubular rivet insert hole, a passage hole and a radially elongated interlock, or a combination of two or more of semi-tubular rivet insert holes, passage holes and radially elongated interlocks, can be provided. Each of the semi-tubular rivet insert hole(s), the passage hole(s) and the radially elongated interlock(s) can be selectively located in a position either radially outward or inward of the magnet insert hole or in the both positions. In the construction in which the semi-tubular rivet insert hole is provided, a semi-tubular rivet is inserted into the semi-tubular rivet insert hole such that a gap is formed between the semi-tubular rivet insert hole and the semi-tubular rivet.

Further, in an auxiliary magnetic pole of the rotor, one of a semi-tubular rivet insert hole, a passage hole and a radially elongated interlock, or a combination of two or more of semi-tubular rivet insert holes, passage holes and radially elongated interlocks, can be provided. Each of the semi-tubular rivet insert hole(s), the passage hole(s) and the radially elongated interlock(s) can be selectively located either in a radially outward or inward region of the rotor or in the both regions.

Further, it can be constructed such that the maximum width of a gap between an outer circumferential surface portion assigned to an auxiliary magnetic pole and the inside surface of the stator is larger than the maximum width of a gap between an outer circumferential surface portion assigned to a main magnetic pole and the inside surface of the stator. It can also be constructed such that a recess is formed in the outer circumferential surface of the rotor and in a position to face an end wall of a magnet insert hole which is adjacent to the outer circumferential surface of the rotor.

The constructions relating to the main magnetic poles, the constructions relating to the auxiliary magnetic poles and the constructions relating to the outer circumferential surface can be appropriately selected and combined such that effects specific to the respective combinations can be obtained.

The size, location and number of each of the semi-tubular rivet insert holes, the passage holes and the interlocks can be appropriately selected.

The present invention is not limited to the constructions as described above in the embodiments, but rather, may be added to, changed, replaced with alternatives or otherwise modified. The size, location and number of the magnet insert holes can be appropriately changed. The size and number of the permanent magnets to be inserted into the magnet insert holes can be appropriately changed. The materials of the permanent magnets can be appropriately selected. The constructions of the rotor and the stator are not limited to those described in the embodiments.

The permanent magnet rotating machine of the present invention can be suitably used as a motor for driving a compressor of a compressing system installed in an air conditioner or a refrigerator, or a motor to be installed in a motor vehicle or other vehicles (a motor for driving a motor vehicle, a motor for driving an apparatus installed on a motor vehicle, such as a door glass, a wiper, a seat, a steering and a door).

What we claim is:

1. An interior permanent magnet motor, having a stator and a rotor, the rotor having main magnetic poles and auxiliary magnetic poles which alternate in a circumferential direction when viewed in cross section perpendicular to the axial direction of the rotor, each of the main magnetic poles having a magnet insert hole for receiving a permanent magnet, the magnet insert hole extending in the axial direction of the rotor, the rotor having a rotary shaft insert hole for receiving a rotary shaft and a semi-tubular rivet insert hole for receiving a semi-tubular rivet, the insert holes extending in the axial direction of the rotor, the rotary shaft having an outside diameter larger than a bore diameter of the rotary shaft insert hole, wherein:

an outer circumferential surface of the rotor is formed of first outer circumferential surface portions and second outer circumferential surface portions which are alternately directly connected in the circumferential direction, wherein each of the first outer circumferential surface portions each has a first curve profile which bulges radially outward and intersects with a d-axis of the assigned main magnetic pole, and each of the second outer circumferential surface portions has a second curve profile which bulges radially outward and intersects with a q-axis of the assigned auxiliary magnetic pole, as viewed in cross section perpendicular to the axial direction of the rotor, wherein the first curve profile has a circular arc shape having its center of curvature on a center of the rotor on the d-axis and having a radius of $R_d$, and the second curve profile has a circular arc shape having its center of curvature on a point on the q-axis displaced from the center of the rotor away from the assigned second outer circumferential surface portion, and having a radius $R_q$ larger than the radius $R_d$, such that the maximum width of a gap between the second outer circumferential surface portion and the inside surface of the stator is larger than the maximum width of a gap between the first outer circumferential surface portion and the inside surface of the stator, the semi-tubular rivet insert hole is disposed in each of the auxiliary magnetic poles, the permanent magnet is inserted into the magnet insert hole such that a gap is formed between the magnet insert hole and the permanent magnet, the semi-tubular rivet is inserted into the semi-tubular rivet insert hole such that a gap is formed between the semi-tubular rivet insert hole and the assigned semi-tubular rivet, and the rotor has an outer surface contour which is not significantly changed at boundaries between the first and second outer circumferential surface portions, such that flow of magnetic flux is prevented from abrupt change when the boundaries between the first and second outer circumferential surface portions pass by teeth of the stator.

2. The interior permanent magnet motor as defined in claim 1, wherein a passage hole is formed in each of the auxiliary magnetic poles and extends in the axial direction of the rotor.

3. The interior permanent magnet motor as defined in claim 2, wherein the passage hole is disposed radially inward of the semi-tubular rivet insert hole in the rotor.

4. The interior permanent magnet motor as defined in claim 2, wherein an interlock is provided at least either in the main magnetic pole or in the auxiliary magnetic pole and elongated in the radial direction of the rotor.

5. The interior permanent magnet motor as defined in claim 4, wherein the interlock is disposed radially outward of the semi-tubular rivet insert hole in the rotor.

6. The interior permanent magnet motor as defined in claim 1, wherein an interlock is provided at least either in the main magnetic pole or in the auxiliary magnetic pole and elongated in the radial direction of the rotor.

7. The interior permanent magnet motor as defined in claim 6, wherein the interlock is provided both in the main magnetic pole and in the auxiliary magnetic pole and a passage hole is formed in the main magnetic pole.

8. The interior permanent magnet motor as defined in claim 6, wherein the interlock is provided in the auxiliary magnetic pole and located radially outward of the semi-tubular rivet insert hole in the rotor.

9. The interior permanent magnet motor as defined in claim 8, wherein a passage hole is formed in the main magnetic pole.

10. The interior permanent magnet motor as defined in claim 1, wherein a recess is formed in the second outer circumferential surface portion and in a position to face an end wall of the magnet insert hole which is adjacent to the outer circumferential surface of the rotor.

11. A compressor driven by a motor, wherein the interior permanent magnet motor as defined in claim 1 is used as the motor.

12. A motor vehicle equipped with a motor, wherein the interior permanent magnet motor as defined in claim 1 is used as the motor.

13. An interior permanent magnet motor, having a stator and a rotor, the rotor having main magnetic poles and auxiliary magnetic poles which alternate in a circumferential direction when viewed in cross section perpendicular to the axial direction of the rotor, each of the main magnetic poles having a magnet insert hole for receiving a permanent magnet, the magnet insert hole extending in the axial direction of the rotor, the rotor having a rotary shaft insert hole for receiving a rotary shaft, a semi-tubular rivet insert hole for receiving a semi-tubular rivet and a passage hole, said holes extending in the axial direction of the rotor, the rotary shaft having an outside diameter larger than a bore diameter of the rotary shaft insert hole, wherein:

an outer circumferential surface of the rotor is formed of first outer circumferential surface portions and second outer circumferential surface portions which are alternately directly connected in the circumferential direction, wherein each of the first outer circumferential surface portions has a first curve profile which bulges radially outward and intersects with a d-axis of the assigned main magnetic pole, and each of the second outer circumferential surface portions has a second curve profile which bulges radially outward and intersects with a q-axis of the assigned auxiliary magnetic pole, as viewed in cross section perpendicular to the axial direction of the rotor, wherein the first curve profile has a circular arc shape having its center of curvature on a center of the rotor on the d-axis and having a radius of $R_d$, and the second curve profile has a circular arc shape having its center of curvature on a point on the q-axis displaced from the center of the rotor away from the assigned second outer circumferential surface portion, and having a radius $R_q$ larger than the radius $R_d$, such that the maximum width of a gap between the second outer circumferential surface portion and the inside surface of the stator is larger than the maximum width of a gap between the first outer circumferential surface portion and the inside surface of the stator, the semi-tubular rivet insert hole is disposed in each of the main magnetic poles of the rotor and located radially outward of the magnet insert hole in the rotor, the passage hole is formed in each of the auxiliary magnetic poles, the permanent magnet is inserted into the magnet insert hole such that a gap is formed between the magnet insert hole and the permanent magnet, the semi-tubular rivet is inserted into the semi-tubular rivet insert hole such that a gap is formed between the semi-tubular rivet insert hole and the semi-tubular rivet, and the rotor has an outer surface contour which is not significantly changed at boundaries between the first and second outer circumferential surface portions, such that flow of magnetic flux is prevented from abrupt chancre when the boundaries between the first and second outer circumferential surface portions pass by teeth of the stator.

14. The interior permanent magnet motor as defined in claim 13, wherein an interlock is provided at least either in the main magnetic pole or in the auxiliary magnetic pole and elongated in the radial direction of the rotor.

15. The interior permanent magnet motor as defined in claim 14, wherein the interlock is disposed radially outward of the semi-tubular rivet insert hole or the passage hole in the rotor.

16. The interior permanent magnet motor as defined in claim 13, wherein a recess is formed in the second outer circumferential surface portion and in a position to face an end wall of the magnet insert hole which is adjacent to the outer circumferential surface of the rotor.

17. A compressor driven by a motor, wherein the interior permanent magnet motor as defined in claim 13 is used as the motor.

18. A motor vehicle equipped with a motor, wherein the interior permanent magnet motor as defined in claim 13 is used as the motor.

* * * * *